US012647251B2

(12) United States Patent
Rao et al.

(10) Patent No.: US 12,647,251 B2
(45) Date of Patent: Jun. 2, 2026

(54) INSTRUCTION TO ACCELERATE CRYPTOGRAPHIC PROCESSING

(71) Applicant: INTERNATIONAL BUSINESS MACHINES CORPORATION, Armonk, NY (US)

(72) Inventors: Rajat Rao, Bangalore (IN); Jonathan D. Bradbury, Poughkeepsie, NY (US); Louis P. Gomes, Poughkeepsie, NY (US); Reinhard Theodor Buendgen, Tuebingen (DE); Soujanya S R, Udupi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/749,865

(22) Filed: Jun. 21, 2024

(65) Prior Publication Data

US 2025/0392444 A1     Dec. 25, 2025

(51) Int. Cl.
*H04L 29/06*     (2006.01)
*H04L 9/06*     (2006.01)

(52) U.S. Cl.
CPC ...... *H04L 9/0637* (2013.01); *H04L 2209/046* (2013.01)

(58) Field of Classification Search
CPC ......................... H04L 9/0637; H04L 2209/046
See application file for complete search history.

(56) References Cited

U.S. PATENT DOCUMENTS

| | | | |
|---|---|---|---|
| 4,471,164 A | 9/1984 | Henry | |
| 5,956,405 A | 9/1999 | Yuval | |
| 8,307,208 B2 * | 11/2012 | Matsuo | H04L 9/002 713/169 |
| 8,316,237 B1 * | 11/2012 | Felsher | H04L 63/061 380/282 |
| 8,675,866 B2 | 3/2014 | Farrugia et al. | |

(Continued)

FOREIGN PATENT DOCUMENTS

| | | |
|---|---|---|
| TW | 200635317 A | 1/2006 |
| TW | 200701729 A | 1/2007 |
| TW | 200725361 A | 1/2007 |

OTHER PUBLICATIONS

International Searching Authority, "Notification of Transmittal of the International Search Report and the Written Opinion of the International Searching Authority, or Declaration," Patent Cooperation Treaty, Aug. 11, 2025, 10 pages, International Application No. PCT/EP2025/061493.

(Continued)

*Primary Examiner* — Mahfuzur Rahman

(74) *Attorney, Agent, or Firm* — Edward J. Wixted, III, Esq.; Blanche E. Schiller, Esq.; Heslin Rothenberg Farley & Mesiti P.C.

(57) ABSTRACT

A cipher instruction is executed. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided.

25 Claims, 10 Drawing Sheets

(56)            References Cited

U.S. PATENT DOCUMENTS

| | | | |
|---|---|---|---|
| 9,363,078 | B2 | 6/2016 | Taylor et al. |
| 11,689,353 | B2 | 6/2023 | Boue et al. |
| 11,743,028 | B2 | 8/2023 | Cioranesco et al. |
| 2002/0085710 | A1 | 7/2002 | Ananth |
| 2005/0175175 | A1 | 8/2005 | Leech |
| 2006/0045264 | A1 | 3/2006 | Kocher et al. |
| 2008/0107260 | A1 | 5/2008 | Duval |
| 2009/0034741 | A1 | 2/2009 | Sabev |
| 2009/0110189 | A1 | 4/2009 | Mayer et al. |
| 2011/0311048 | A1 | 12/2011 | Nagata et al. |
| 2012/0155638 | A1 | 6/2012 | Farrugia et al. |
| 2012/0254625 | A1 | 10/2012 | Farrugia et al. |
| 2014/0074719 | A1* | 3/2014 | Gressel ............... G06Q 30/06 |
| | | | 713/168 |
| 2014/0331050 | A1 | 11/2014 | Armstrong et al. |
| 2015/0200772 | A1 | 7/2015 | Yamada |
| 2015/0341168 | A1 | 11/2015 | Gueron |
| 2016/0012252 | A1 | 1/2016 | Deleeuw et al. |
| 2016/0315763 | A1 | 10/2016 | Hammon et al. |
| 2017/0237558 | A1 | 8/2017 | Yuan et al. |
| 2017/0289390 | A1* | 10/2017 | Takasu ................. H04N 1/4493 |
| 2017/0346622 | A1 | 11/2017 | Howard |
| 2018/0174493 | A1* | 6/2018 | Ohori .................... H04L 9/0656 |
| 2019/0182034 | A1 | 6/2019 | Mccarthy et al. |
| 2019/0349187 | A1 | 11/2019 | Do et al. |
| 2020/0336301 | A1 | 10/2020 | Mccarthy et al. |
| 2020/0336304 | A1 | 10/2020 | Hammon et al. |
| 2022/0198027 | A1 | 6/2022 | Chhabra et al. |
| 2022/0382885 | A1 | 12/2022 | Durham et al. |
| 2023/0037780 | A1 | 2/2023 | Goveas |
| 2024/0007268 | A1 | 1/2024 | Yankilevich et al. |
| 2024/0054136 | A1* | 2/2024 | Boudguiga ............. G06F 21/31 |
| 2024/0061943 | A1 | 2/2024 | Durham et al. |
| 2024/0291863 | A1* | 8/2024 | Cohen ................. H04L 63/1491 |
| 2025/0062895 | A1* | 2/2025 | Naito .................... H04L 9/3226 |

OTHER PUBLICATIONS

Dworkin, Morris, "Recommendation for Block Cipher Modes of Operation: The XTS-AES Mode for Confidentiality on Storage Devices," NIST Special Publication 800-38E, Jan. 2010, 12 pages.

IBM, "z/Architecture Principles of Operation," IBM Publication No. SA22-7832-13, Fourteenth Edition, May 2022, pp. 1-2124.

Rao, Rajat et al., "Protection of Cryptographic Parameters Used In Cryptographic Processing," U.S. Appl. No. 18/749,928, filed Jun. 21, 2024, pp. 1-74.

List of IBM Patents or Patent Applications Treated as Related, filed Jun. 24, 2024, pp. 1-2.

International Searching Authority, "Notification of Transmittal of the International Search Report and the Written Opinion of the International Searching Authority, or Declaration," Patent Cooperation Treaty, Jul. 23, 2025, 12 pages, International Application No. PCT/EP2025/061500.

* cited by examiner

100

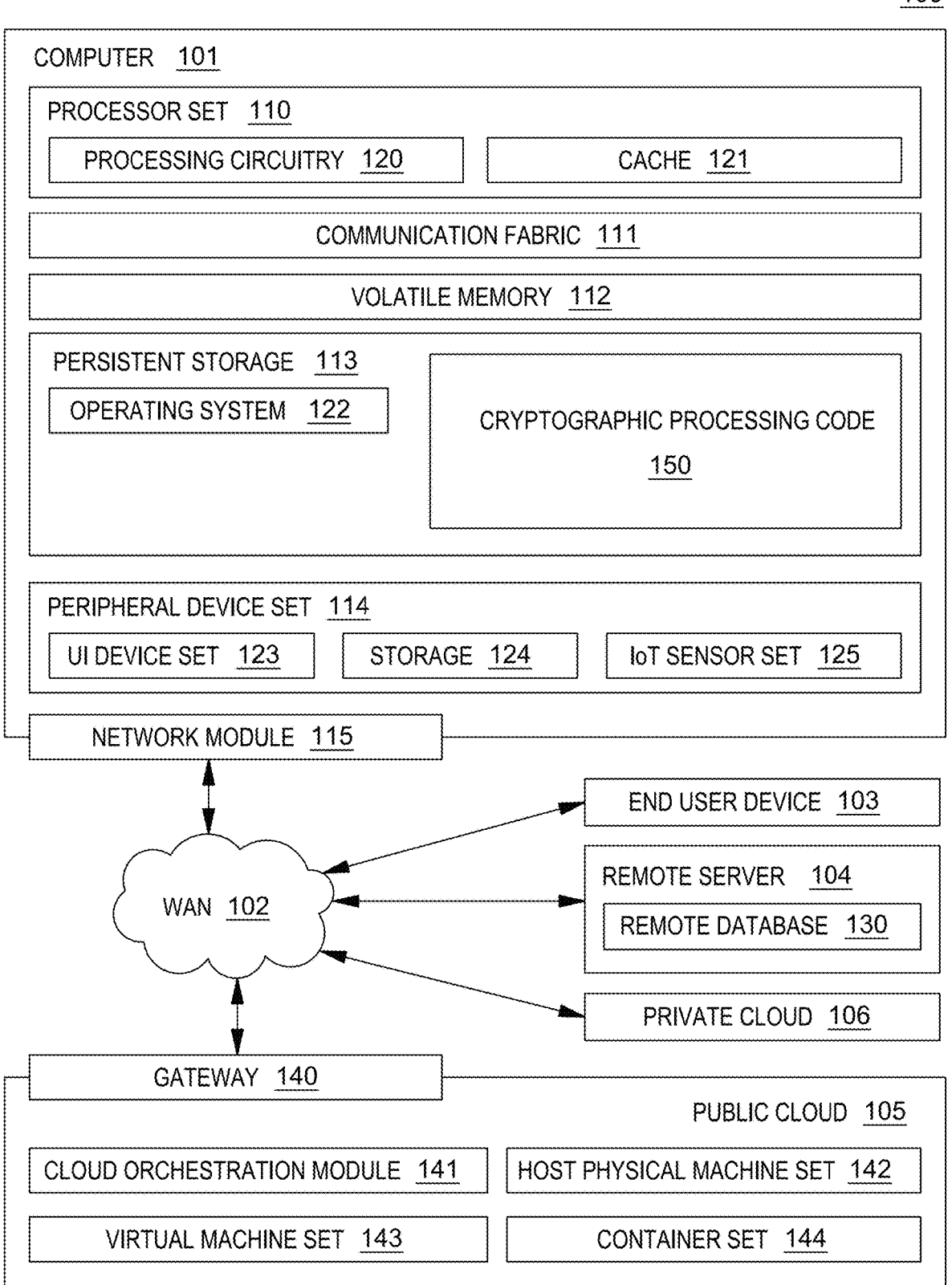

COMPUTER   101

PROCESSOR SET   110

PROCESSING CIRCUITRY   120          CACHE   121

COMMUNICATION FABRIC   111

VOLATILE MEMORY   112

PERSISTENT STORAGE   113

OPERATING SYSTEM   122

CRYPTOGRAPHIC PROCESSING CODE
150

PERIPHERAL DEVICE SET   114

UI DEVICE SET   123          STORAGE   124          IoT SENSOR SET   125

NETWORK MODULE   115

WAN   102

END USER DEVICE   103

REMOTE SERVER   104

REMOTE DATABASE   130

PRIVATE CLOUD   106

GATEWAY   140

PUBLIC CLOUD   105

CLOUD ORCHESTRATION MODULE   141          HOST PHYSICAL MACHINE SET   142

VIRTUAL MACHINE SET   143          CONTAINER SET   144

CRYPTOGRAPHIC PROCESSING CODE

OBTAIN INSTRUCTION CODE — 300

EXECUTE INSTRUCTION CODE — 330

330

EXECUTE INSTRUCTION CODE

OBTAIN OPERANDS CODE — 332

PERFORM CRYPTOGRAPHIC
PROCESSING CODE — 336

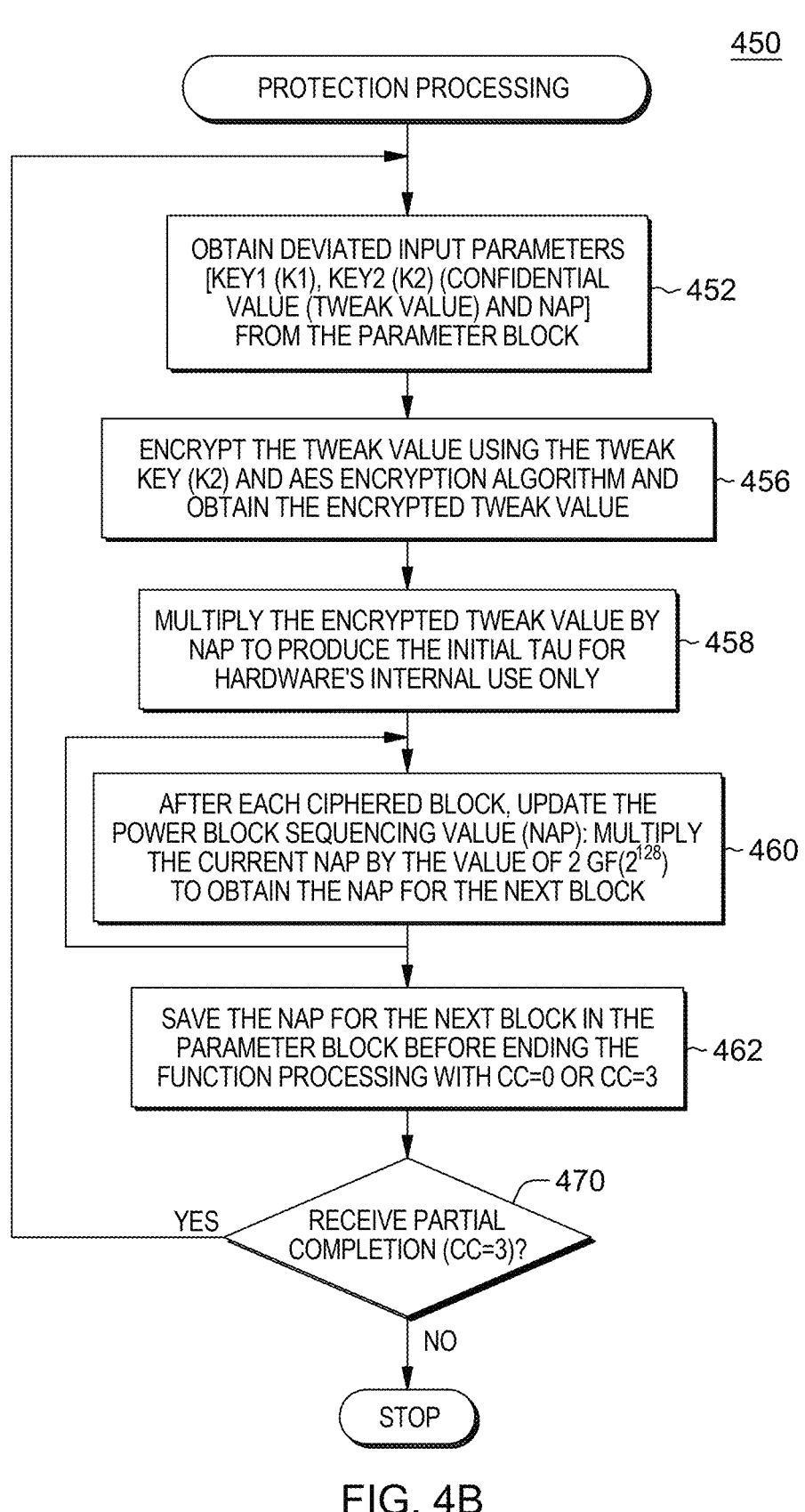

450

PROTECTION PROCESSING

OBTAIN DEVIATED INPUT PARAMETERS [KEY1 (K1), KEY2 (K2) (CONFIDENTIAL VALUE (TWEAK VALUE) AND NAP] FROM THE PARAMETER BLOCK ~452

ENCRYPT THE TWEAK VALUE USING THE TWEAK KEY (K2) AND AES ENCRYPTION ALGORITHM AND OBTAIN THE ENCRYPTED TWEAK VALUE ~456

MULTIPLY THE ENCRYPTED TWEAK VALUE BY NAP TO PRODUCE THE INITIAL TAU FOR HARDWARE'S INTERNAL USE ONLY ~458

AFTER EACH CIPHERED BLOCK, UPDATE THE POWER BLOCK SEQUENCING VALUE (NAP): MULTIPLY THE CURRENT NAP BY THE VALUE OF 2 $GF(2^{128})$ TO OBTAIN THE NAP FOR THE NEXT BLOCK ~460

SAVE THE NAP FOR THE NEXT BLOCK IN THE PARAMETER BLOCK BEFORE ENDING THE FUNCTION PROCESSING WITH CC=0 OR CC=3 ~462

~470

YES ◄ RECEIVE PARTIAL COMPLETION (CC=3)?

NO

STOP

CIPHER MESSAGE

| OPCODE | R₁ | R₂ |
|---|---|---|

502     504     506

_510_

R₁ | FIRST OPERAND ADDRESS

512

_520_

R₂ | SECOND OPERAND ADDRESS

522

_530_

R₂+1 | SECOND OPERAND LENGTH

532

_540_

GR0 | MODIFIER | FUNCTION CODE 544       546

_550_

GR1 | PARAMETER BLOCK ADDRESS

552

_560_

PARAMETER BLOCK - CIPHER MESSAGE

| CRYPTOGRAPHIC KEY 1 (K1) | —562 |
| CRYPTOGRAPHIC KEY 2 (K2) | —564 |
| TWEAK VALUE | —566 |
| NEXT ALPHA POWER | —568 |

36

INSTRUCTION TO ACCELERATE CRYPTOGRAPHIC PROCESSING

BACKGROUND

One or more aspects relate, in general, to cryptographic processing within a computing environment, and in particular, to improving processing of cryptographic operations used in cryptographic processing.

Cryptography is used for the protection of data. There are a number of cryptographic algorithms or techniques, including the XTS-AES (XEX (XOR Encrypt XOR) Tweakable Block Cipher with Ciphertext Stealing-Advanced Encryption Standard) algorithm, as well as others. The XTS-AES standard uses a confidential value (e.g., a tweak value) to provide added protection. The confidential value is encrypted using a data key, referred to as a protected key.

Cryptographic processing includes performing one or more cipher operations including, for instance, encryption and decryption operations. Processing relating to these operations is to be improved.

SUMMARY

Shortcomings of the prior art are overcome, and additional advantages are provided through the provision of a computer program product. The computer program product includes a set of one or more computer-readable storage media and program instructions, collectively stored in the set of one or more computer-readable storage media, for causing at least one computing device to perform computer operations. The computer operations include executing a cipher instruction. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided.

In one or more aspects, a computer system is provided. The computer system includes at least one hardware accelerator to be used in executing a cipher instruction. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to incorporate and use one or more aspects of the present disclosure;

FIG. 4B depicts one example of protection processing to protect an encrypted confidential value, in accordance with one or more aspects of the present disclosure;

DETAILED DESCRIPTION

Figure 2:
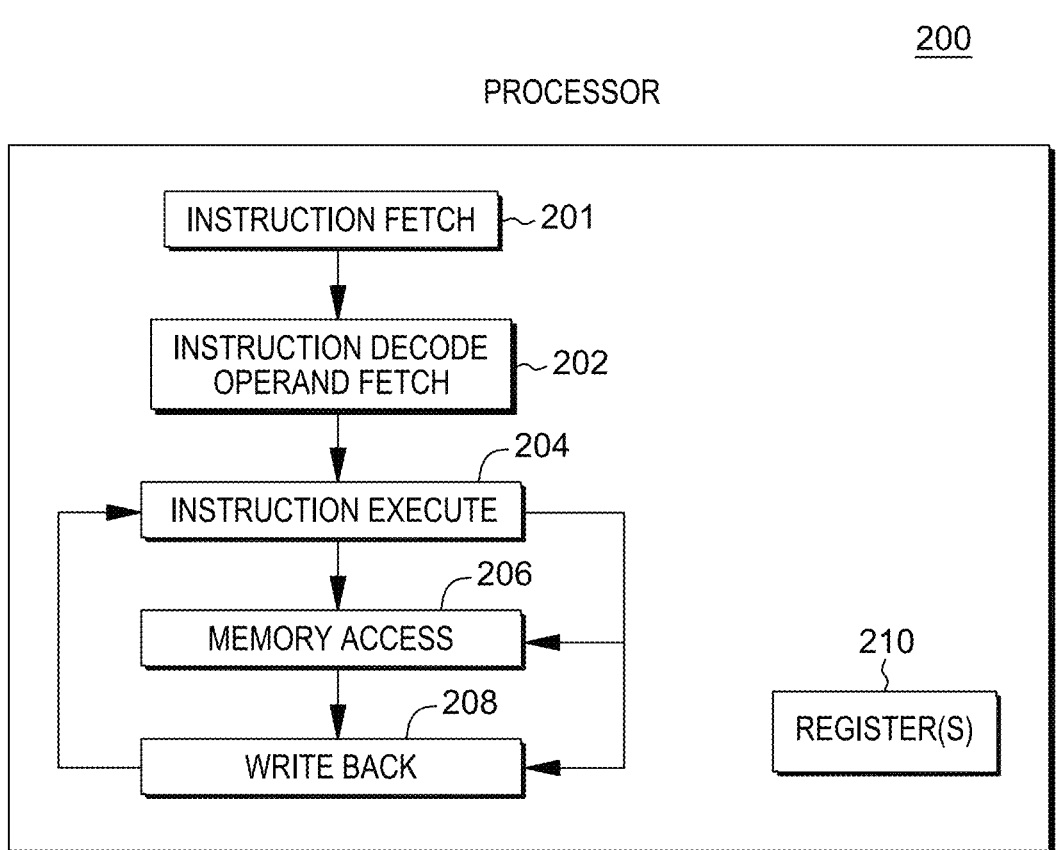
FIG. 2 depicts one example of further details of a processor of the processor set of FIG. 1, in accordance with one or more aspects of the present disclosure.

In accordance with one or more aspects of the present disclosure, a capability is provided to accelerate cryptographic processing, including, but not limited to, accelerating performance of a cipher operation (e.g., an encryption or decryption operation) of a message. In one or more aspects, the cryptographic processing is accelerated by providing an instruction (e.g., a single architected instruction) that performs multiple operations or functions of the cryptographic processing including, for instance, encrypting a confidential value (e.g., a tweak value) used in a cipher operation, as well as performing the cipher operation on a message. Further, cryptographic processing is accelerated by allowing that instruction to be interrupted and then resumed from where it was interrupted using saved state of the instruction. This is in contrast to repeating the encryption/decryption or having to separately determine, external to the instruction, where the encryption/decryption was interrupted and where it should be resumed.

In one or more aspects, a single instruction (e.g., a cipher instruction, such as a cipher message instruction, or other instruction) is provided that encodes parameters to be used for cryptographic processing (e.g., XTS computation of a cryptographic function or operation). The single instruction is interruptible and includes the state to be used to resume cryptographic processing without compromising security. The single instruction is executed in hardware (e.g., at least one hardware accelerator), in one example, such that a full cryptographic function (e.g., including an XTS encipher operation; XTS decipher operation) is sequenced without exposing a mask value (e.g., a modification mask, such as an XTS mask, also referred to as herein as TAU). In one or more aspects, an interruptible cryptographic function (e.g., including an AES-XTS operation) is implemented without leaking the mask value and which saves state information, such as, e.g., a power block sequencing value (e.g., a next alpha power (NAP)), to be used to resume interrupted processing.

In one or more aspects, a capability is provided to protect the encrypted confidential value (e.g., encrypted tweak value) by protecting the mask value used in the cryptographic processing and which is initially generated using the encrypted confidential value. The mask value is not stored external to the hardware or processor, but instead, is generated as part of executing the instruction, providing protection of the mask and ultimately the encrypted confidential value (by not enabling a determination of the encrypted confidential value using the mask).

In one or more aspects, a format of the instruction (e.g., cipher message instruction) includes one or more parameters, such as, for instance: one or more keys (e.g., key 1 (K1), key 2 (K2)), a message address, a confidential value (e.g., tweak value), a block index (also referred to as a power block sequencing value (e.g., a next alpha power)) and a message length. Additional, fewer and/or other parameters may be used. For instance, in one or more aspects, instead of individual keys, key 1 and key 2, the parameters include an encrypted double- or multiple-key, in which a plurality of keys (e.g., key 1, key 2) is encrypted together as a single encrypted key. In this instance, the instruction decrypts the single encrypted key to obtain the individual keys (e.g., key 1, key 2). Again, additional, fewer and/or other parameters may be used. In one or more aspects, the instruction enables the use of the keys protected from software and used by index tokens (e.g., wrapping key verification pattern to be used in decryption operations). In one or more aspects, the instruction uses state information (e.g., next alpha power, which is an example of a chaining or power block sequencing value) to allow interruption and resumption of the cryptographic processing (e.g., including, at least, a cipher operation) without compromising security.

In one or more aspects, cryptographic processing is accelerated by using at least one hardware accelerator that is able to perform a plurality of operations of the instruction and/or the cryptographic processing. For instance, the hardware accelerator(s) is/are configured to: sequence various operations used in cryptographic processing, including, for instance, AES-GCM (Advanced Encryption Standard-Galois Counter Mode), GHASH (a hash function of AES-GCM) and AES-XTS multiplication operations on shared accelerator hardware capable of handling data in formats specific to the various operations; sequence tweak encryption, XOR masking, GF(2) (Galois field 2) multiplication and data encryption/decryption in a way to compute the entire cryptographic function (e.g., AES-XTS); schedule various operations (e.g., of an AES-XTS function) in hardware in a way to allow interruption and resumption of operations; maintain state information (e.g., 128-bit state information) in the hardware that can be read by firmware, enabling interruption and resumption of the processing; and/or protection of key latches on a scan dump.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing a cipher instruction. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided. By providing a single instruction to perform the encrypting of the confidential value and performing the cipher operation, system performance is improved, and processing speed is increased. Further, latency is reduced.

Additionally, or alternatively, in one or more embodiments, the generating the mask value includes multiplying the encrypted confidential value by a power block sequencing value to generate the mask value. By generating the mask value as part of executing of the instruction, the mask value is not stored and not visible external to the processor or hardware executing the instruction. This protects the mask value.

Additionally, or alternatively, in one or more embodiments, the power block sequencing value is input to the cipher instruction and is a changing value depending on which part of the message the cipher operation is being performed. By using the power block sequencing value, execution of the cipher instruction may be resumed enabling the cipher operation to be performed on an entire message in a streamlined manner.

Additionally, or alternatively, in one or more embodiments, the generating the mask value includes using the encrypted confidential value and a power block sequencing value to generate the mask value. The executing the cipher instruction further includes performing block-wise updates to the power block sequencing value and the mask value, in which the power block sequencing value and the mask value are maintained in-step with one another. By having the power block sequencing value and the mask value be in-step with one another, the instruction may be interrupted and resumed from the point at which it was interrupted. This increases performance and processing speed in performing the cipher operation. Further, protections are provided for the mask value.

Additionally, or alternatively, in one or more embodiments, the computer operations further include interrupting execution of the cipher instruction at a location of the message, in which the cipher operation of the message ends prior to completion of the cipher operation of the message. The cipher instruction is re-executed. The re-executing obtains an updated power block sequencing value to resume the cipher operation of the message at the location of the message. The updated power block sequencing value is an input to the cipher instruction being re-executed and is based on the block-wise updates. By providing a capability to interrupt the cipher instruction, high priority interrupts are able to be serviced providing improved responsiveness of a processor. The use of an instruction to perform cryptographic processing, including the cipher operation, provides a streamlined pipeline to perform the cryptographic processing.

Additionally, or alternatively, in one or more embodiments, the message includes a plurality of message blocks, and the location of the message is a message block of the plurality of message blocks of the message. By providing a capability to interrupt the cipher instruction at a message block within the message, high priority interrupts are able to be serviced providing improved responsiveness of a processor.

Additionally, or alternatively, in one or more embodiments, the performing block-wise updates includes updating the power block sequencing value and the mask value based on proceeding to a next message block of the message in the cipher operation. By using the power block sequencing value to resume execution of the cipher instruction, the cipher operation is performed on an entire message in a streamlined manner.

Additionally, or alternatively, in one or more embodiments, operations of the cipher operation are sequenced using at least one hardware accelerator to allow the interrupting and the re-executing. Use of the at least one hardware accelerator facilitates processing and improves performance. By sequencing the operations, the operations may be interrupted and then resumed.

Additionally, or alternatively, in one or more embodiments, the power block sequencing value is maintained in the at least one hardware accelerator. Use of the at least one hardware accelerator to save the value improves latency by avoiding memory accesses to obtain the value.

Additionally, or alternatively, in one or more embodiments, the cipher instruction obtains as input a plurality of cryptographic parameters to be used in performing the encrypting the confidential value and the cipher operation. The plurality of cryptographic parameters is specified using one or more registers of the instruction. Use of a single instruction and the plurality of cryptographic parameters enables lower software processing overhead and improved performance.

Additionally, or alternatively, in one or more embodiments, the plurality of cryptographic parameters includes a key to be used in the encrypting the confidential value, a data key to be used in the cipher operation, an address of the message, the confidential value and a power block sequencing value to be used to generate the mask value. Providing the cryptographic parameters, including a key to be used in the encrypting the confidential value, a data key to be used in the cipher operation, an address of the message, the confidential value and a power block sequencing value, as part of the cipher instruction improves performance by avoiding memory accesses, reducing latency, and providing instruction pipelining. Use of a single instruction and the plurality of parameters enables lower software processing overhead and improved performance. Use of the key to be used in the encrypting the confidential value provides additional security.

Additionally, or alternatively, in one or more embodiments, the key to be used in the encrypting the confidential value, the data key to be used in the cipher operation, the confidential value and the power block sequencing value are included in a parameter block. The parameter block is an input to the cipher instruction. A register of the instruction includes at least a portion of an address of the parameter block. Providing the key to be used in the encrypting the confidential value, the data key to be used in the cipher operation, the confidential value and the power block sequencing value in a parameter block that is input to the cipher instruction improves performance by avoiding memory accesses, reducing latency, and providing instruction pipelining. Use of a single instruction and the plurality of parameters enables lower software processing overhead and improved performance.

Additionally, or alternatively, in one or more embodiments, the message includes a plurality of message blocks. The performing the cipher operation includes determining a block mask value using the mask value for a message block of the plurality of message blocks and performing the cipher operation on the message block using the block mask value. By determining the block mask value using the mask value, instead of storing the mask value, the mask value is protected and the cipher operation is improved.

Additionally, or alternatively, in one or more embodiments, the determining the block mask value for a next message block is based on the block mask value of a previous message block. This improves performance by facilitating computation of the block mask value.

In accordance with one or more aspects, each of the embodiments is separable and optional from one another. Further, embodiments may be combined with one another.

In one or more aspects, a computer system is provided. The computer system includes at least one computing device, a set of one or more computer-readable storage media, and program instructions, collectively stored in the set of one or more computer-readable storage media, for causing the at least one computing device to perform computer operations. The computer operations include executing a cipher instruction. The executing the cipher instruction includes encrypting a confidential value to provide an encrypted confidential value and generating a mask value using the encrypted confidential value. A cipher operation of at least a portion of a message specified by the cipher instruction is performed. The performing the cipher operation on the at least the portion of the message uses the mask value. A result of the cipher operation is provided. By providing a single instruction to perform the encrypting of the confidential value and performing the cipher operation, system performance is improved, and processing speed is increased. Further, latency is reduced.

Additionally, or alternatively, in one or more embodiments, the generating the mask value includes using the encrypted confidential value and a power block sequencing value to generate the mask value. The executing the cipher instruction further includes performing block-wise updates to the power block sequencing value and the mask value, in which the power block sequencing value and the mask value are maintained in-step with one another. By having the power block sequencing value and the mask value be in-step with one another, the instruction may be interrupted and resumed from the point at which it was interrupted. This increases performance and processing speed in performing the cipher operation. Further, protections are provided for the mask value.

Additionally, or alternatively, in one or more embodiments, the computer operations further include interrupting execution of the cipher instruction at a location of the message, in which the cipher operation of the message ends prior to completion of the cipher operation of the message. The cipher instruction is re-executed. The re-executing obtains an updated power block sequencing value to resume the cipher operation of the message at the location of the message. The updated power block sequencing value is an input to the cipher instruction being re-executed and is based on the block-wise updates. By providing a capability to interrupt the cipher instruction, high priority interrupts are able to be serviced providing improved responsiveness of a processor. The use of an instruction to perform the cipher operation provides a streamlined pipeline to perform the cipher operation and/or other cryptographic processing.

Additionally, or alternatively, in one or more embodiments, the cipher instruction obtains as input a plurality of cryptographic parameters to be used in performing the encrypting the confidential value and the cipher operation. The plurality of cryptographic parameters is specified using one or more registers of the instruction. The plurality of cryptographic parameters includes a key to be used in the encrypting the confidential value, a data key to be used in the cipher operation, an address of the message, the confidential value and a power block sequencing value to be used to generate the mask value. Providing the cryptographic parameters, including a key to be used in the encrypting the confidential value, a data key to be used in the cipher operation, an address of the message, the confidential value and the power block sequencing value, as part of the cipher instruction improves performance by avoiding memory accesses, reducing latency, and providing instruction pipelining. Use of a single instruction and the plurality of cryptographic parameters enables lower software processing overhead and improved performance. Use of the key to be used in the encrypting the confidential value provides additional security.

In accordance with one or more aspects, each of the embodiments is separable and optional from one another. Further, embodiments may be combined with one another.

In one or more aspects, a computer-implemented method is provided. The computer-implemented method includes executing a cipher instruction. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of cipher operation is provided. By providing a single instruction to perform the encrypting of the confidential value and performing the cipher operation, system performance is improved, and processing speed is increased. Further, latency is reduced.

Additionally, or alternatively, in one or more embodiments, the generating the mask value includes using the encrypted confidential value and a power block sequencing value to generate the mask value. The executing the cipher instruction further includes performing block-wise updates to the power block sequencing value and the mask value, in which the power block sequencing value and the mask value are maintained in-step with one another. By having the power block sequencing value and the mask value be in-step with one another, the instruction may be interrupted and resumed from the point at which it was interrupted. This increases performance and processing speed in performing cryptographic processing. Further, protections are provided for the mask value.

Additionally, or alternatively, in one or more embodiments, the computer operations further include interrupting execution of the cipher instruction at a location of the message, in which the cipher operation of the message ends prior to completion of the cipher operation on the message. The cipher instruction is re-executed. The re-executing obtains an updated power block sequencing value to resume the cipher operation of the message at the location of the message. The updated power block sequencing value is an input to the cipher instruction being re-executed and is based on the block-wise updates. By providing a capability to interrupt the cipher instruction, high priority interrupts are able to be serviced providing improved responsiveness of a processor. The use of an instruction to perform the cipher operation provides a streamlined pipeline to perform the cipher operation.

Additionally, or alternatively, in one or more embodiments, the cipher instruction obtains as input a plurality of cryptographic parameters to be used in performing the encrypting the confidential value and the cipher operation. The plurality of cryptographic parameters is specified using one or more registers of the instruction. The plurality of cryptographic parameters includes a key to be used in the encrypting the confidential value, a data key to be used in the cipher operation, an address of the message, the confidential value and a power block sequencing value to be used to generate the mask value. Providing the cryptographic parameters, including a key to be used in the encrypting the confidential value, a data key to be used in the cipher operation, an address of the message, the confidential value and a power block sequencing value, as part of the cipher instruction improves performance by avoiding memory accesses, reducing latency, and providing instruction pipelining. Use of a single instruction and the plurality of cryptographic parameters enables lower software processing overhead and improved performance. Use of the key to be used in the encrypting the confidential value provides additional security.

In accordance with one or more aspects, each of the embodiments is separable and optional from one another. Further, embodiments may be combined with one another.

In one or more aspects, a computer system is provided. The computer system includes at least one hardware accelerator to be used in executing a cipher instruction. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided. By providing a single instruction to perform the encrypting of the confidential value and performing the cipher operation, system performance is improved, and processing speed is increased. Further, latency is reduced. The use of an instruction to perform the cipher operation provides a streamlined pipeline to perform the cipher operation. Use of the at least one hardware accelerator facilitates processing and improves performance.

Additionally, or alternatively, in one or more embodiments, the generating the mask value includes using the encrypted confidential value and a power block sequencing value to generate the mask value. Further, the executing the cipher instruction includes performing block-wise updates to the power block sequencing value and the mask value. The power block sequencing value and the mask value are maintained in-step with one another. The computer system is used to perform computer operations including interrupting execution of the cipher instruction at a location of the message, in which the cipher operation of the message ends prior to completion of the cipher operation of the message. The cipher instruction is re-executed. The re-executing obtains an updated power block sequencing value to resume the cipher operation of the message at the location of the message. Operations of the cipher operation are sequenced to enable the interrupting and the re-executing. By providing a capability to interrupt the cipher instruction, high priority interrupts are able to be serviced providing improved responsiveness of a processor. The use of an instruction to perform cryptographic processing, including encryption of the confidential value and the cipher operation, provides a streamlined pipeline to perform the cryptographic processing.

In accordance with one or more aspects, each of the embodiments is separable and optional from one another. Further, embodiments may be combined with one another.

In one or more aspects, a computer-implemented method is provided. The computer-implemented method includes executing a cipher instruction using at least one hardware accelerator. The executing the cipher instruction includes encrypting a confidential value to provide an encrypted confidential value and generating a mask value using the encrypted confidential value. A cipher operation is performed on at least a portion of a message specified by the cipher instruction. The performing the cipher operation on the at least the portion of the message uses the mask value. A result of the cipher operation is provided. By providing a single instruction to perform the encrypting of the confidential value and performing the cipher operation, system performance is improved, and processing speed is increased. Further, latency is reduced. The use of an instruction and at least one hardware accelerator to perform the cipher operation provides a streamlined pipeline to perform the cipher operation.

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing a cipher instruction. The executing the cipher instruction includes encrypting a confidential value to provide an encrypted confidential value and generating a mask value using the encrypted confidential value. The generating the mask value includes multiplying the encrypted confidential value by a power block sequencing value to generate the mask value. Block-wise updates are performed to the power block sequencing value and the mask value, in which the power block sequencing value and the mask value are maintained in-step with one another. A cipher operation is performed on at least a portion of a message specified by the cipher instruction. The performing the cipher operation on the at least the portion of the message uses the mask value. A result of the cipher operation is provided. By providing a single instruction to perform the encrypting of the confidential value and performing the cipher operation, system performance is improved, and processing speed is increased. Further, latency is reduced. By generating the mask value as part of executing of the instruction, the mask value is not stored and not visible external to the processor or hardware executing the instruction. This protects the mask value. By having the power block sequencing value and the mask value be in-step with one another, the instruction may be interrupted and resumed from the point at which it was interrupted. This increases performance and processing speed in performing the cipher operation. Further, protections are provided for the mask value.

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing a cipher instruction. The executing the cipher instruction includes encrypting a confidential value to provide an encrypted confidential value and generating a mask value using the encrypted confidential value. The generating the mask value includes using the encrypted confidential value and a power block sequencing value to generate the mask value. Block-wise updates are performed to the power block sequencing value and the mask value, in which the power block sequencing value and the mask value are maintained in-step with one another. A cipher operation is performed on at least a portion of a message specified by the cipher instruction. The performing the cipher operation on the at least the portion of the message uses the mask value. The message includes a plurality of message blocks. The performing the cipher operation includes determining a block mask value using the mask value for a message block of the plurality of message blocks and performing the cipher operation on the message block using the block mask value. A result of the cipher operation is provided. By providing a single instruction to perform the encrypting of the confidential value and performing the cipher operation, system performance is improved, and processing speed is increased. Further, latency is reduced. By generating the mask value as part of executing of the instruction, the mask value is not stored and not visible external to the processor or hardware executing the instruction. This protects the mask value. By determining the block mask value using the mask value, instead of storing the mask value, the mask value is protected, and the cipher operation is improved. This increases performance and processing speed in performing the cipher operation. Further, protections are provided for the mask value. The use of an instruction to perform the cipher operation provides a streamlined pipeline to perform the cipher operation.

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing a cipher instruction. The executing the cipher instruction includes encrypting a confidential value to provide an encrypted confidential value and generating a mask value using the encrypted confidential value. The generating the mask value includes using the encrypted confidential value and a power block sequencing value to generate the mask value. Block-wise updates are performed to the power block sequencing value and the mask value, in which the power block sequencing value and the mask value are maintained in-step with one another. A cipher operation is performed on at least a portion of a message specified by the cipher instruction. The performing the cipher operation on the at least the portion of the message uses the mask value. A result of the cipher operation is provided. The cipher instruction obtains as input a plurality of cryptographic parameters to be used in performing the encrypting the confidential value and the cipher operation. The plurality of cryptographic parameters is specified using one or more registers of the instruction. The plurality of cryptographic parameters includes a key to be used in the encrypting the confidential value, a data key to be used in the cipher operation, an address of the message, the confidential value and the power block sequencing value to be used to generate the mask value. The key to be used in the encrypting the confidential value, the data key to be used in the cipher operation, the confidential value and the power block sequencing value are included in a parameter block. The parameter block is an input to the cipher instruction. A register of the instruction includes at least a portion of an address of the parameter block. By providing a single instruction to perform the encrypting of the confidential value and performing the cipher operation, system performance is improved, and processing speed is increased. Further, latency is reduced. Providing the cryptographic parameters, including a key to be used in the encrypting the confidential value, a data key to be used in the cipher operation, an address of the message, the confidential value and a power block sequencing value, as part of the cipher instruction improves performance by avoiding memory accesses, reducing latency, and providing instruction pipelining. Use of a single instruction and the plurality of cryptographic parameters enables lower software processing overhead and improved performance. Use of the key to be used in the encrypting the confidential value provides additional security. Providing the key to be used in the encrypting the confidential value, the data key to be used in the cipher operation, the confidential value and the power block sequencing value in a parameter block that is input to the cipher instruction improves performance by avoiding memory accesses, reducing latency, and providing instruction pipelining.

In accordance with one or more aspects, each of the embodiments is separable and optional from one another. Further, embodiments may be combined with one another.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs cryptographic processing, including, e.g., accelerated cryptographic processing, interruptible cryptographic processing, and/or protection processing (e.g., of the encrypted confidential value and/or mask value) and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as cryptographic processing code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after Instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

In one example, a processor (e.g., of processor set 110) includes a plurality of functional components (or a subset thereof) used to execute instructions. As depicted in FIG. 2, in one example, a processor 200 includes, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use cryptographic processing code 150. Additional, fewer and/or other components may be used in one or more aspects of the present disclosure.

In one example, cryptographic processing code (e.g., cryptographic processing code 150) is used, in accordance with one or more aspects of the present disclosure, to perform cryptographic processing, including accelerated cryptographic processing, interruptible cryptographic processing and/or protection processing of, e.g., one or more parameters used in the cryptographic processing. Cryptographic processing code (e.g., cryptographic processing code 150) includes code or instructions used to perform accelerated cryptographic processing, interruptible cryptographic processing, protection processing and/or other tasks, in accordance with one or more aspects of the present disclosure. Cryptographic processing code (e.g., cryptographic processing code 150) includes, in one example, various code to be used to perform cryptographic processing, including accelerated cryptographic processing, interruptible cryptographic processing and/or protection processing. The code is, e.g., computer-readable program code (e.g., instructions) in computer-readable media, e.g., storage (persistent storage 113, cache 121, storage 124, other storage, as examples). The computer-readable storage media may be part of one or more computer program products and the computer-readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators and/or computing devices may be used to execute the code and/or portions thereof. Many examples are possible.

Figure 3A:
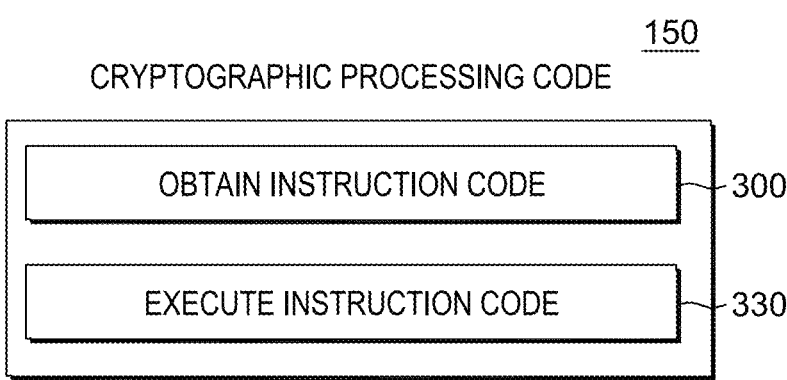
FIG. 3A depicts one example of cryptographic processing code of FIG. 1, in accordance with one or more aspects of the present disclosure.

One example of cryptographic processing code 150 is described with reference to FIG. 3A. In one example, cryptographic processing code 150 includes obtain instruction code 300 to obtain (e.g., receive, be provided, pull, retrieve, fetch, etc.) an instruction, such as a cipher instruction (e.g., a cipher message instruction), another instruction, to perform cryptographic processing, including accelerated cryptographic processing, interruptible cryptographic processing and/or protection processing; and execute instruction code 330 to execute the instruction.

Figure 3B:
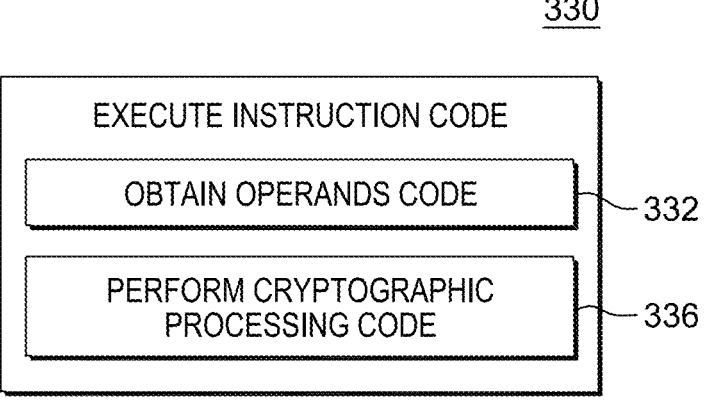
FIG. 3B depicts one example of execute instruction code of the cryptographic processing code of FIG. 3A, in accordance with one or more aspects of the present disclosure.

Further details of execute instruction code 330 are described with reference to FIG. 3B. In one example, execute instruction code 330 includes obtain operands code 332 to obtain one or more operands and/or information of the obtained instruction; and perform cryptographic processing code 336 to perform cryptographic processing of the instruction, including, e.g., one or more cipher operations of the instruction (e.g., encryption, decryption) and/or other operations relating thereto.

At least a portion of the code (e.g., code 300-330, 332-336) is used, in accordance with one or more aspects of the present disclosure, to perform cryptographic processing, including accelerated cryptographic processing, interruptible cryptographic processing and/or protection processing. In one example, referring to FIG. 4A, a cryptographic process 400 (also referred to herein as process 400) to perform cryptographic processing is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators and/or computing devices may be used to execute the processing and/or aspects thereof. Many examples are possible.

Figure 4A:
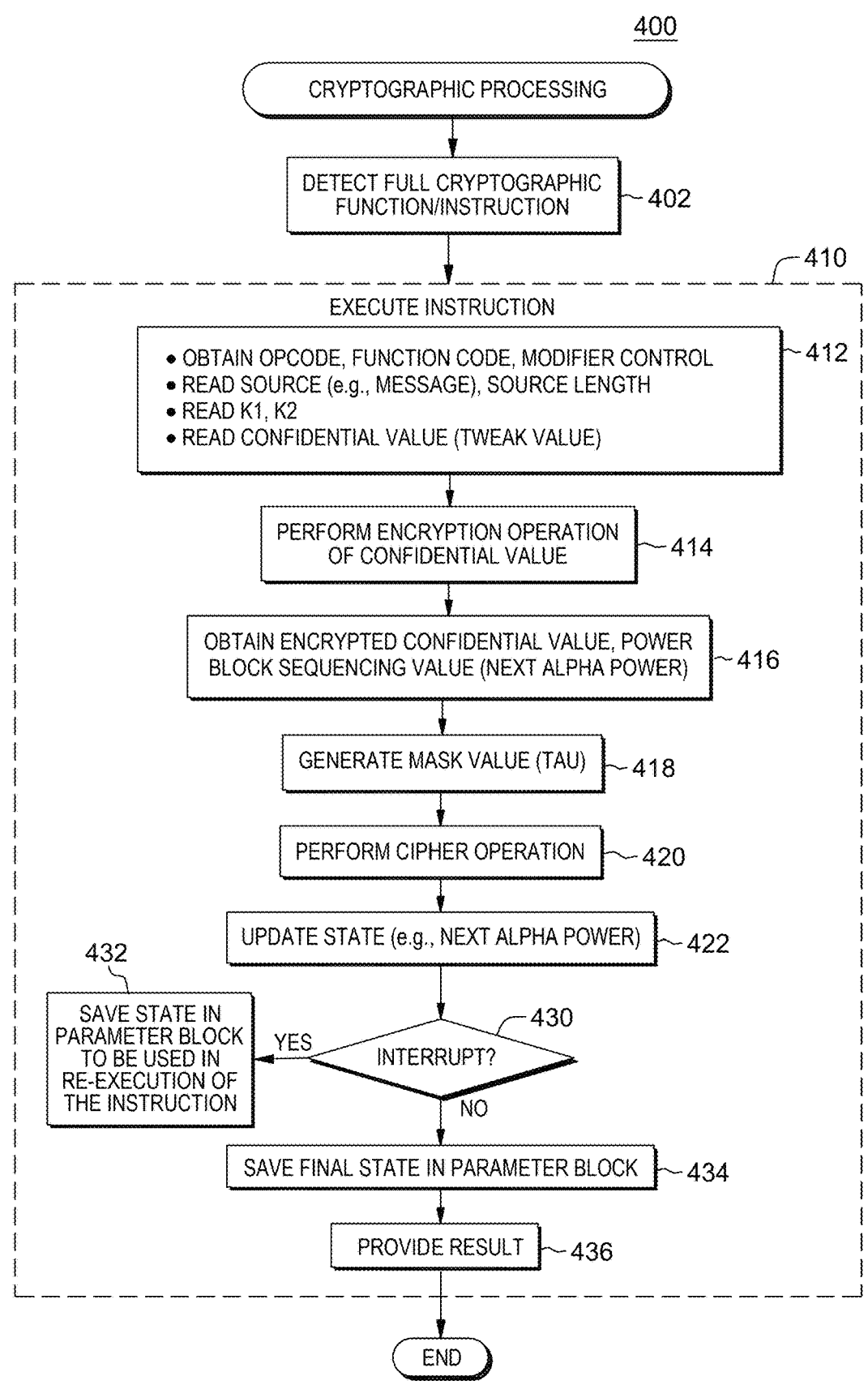
FIG. 4A depicts one example of cryptographic processing, in accordance with one or more aspects of the present disclosure.

Referring to FIG. 4A, in one example, process 400 detects 402 that a selected cryptographic function (e.g., full XTS encryption function) is to be performed. In one example, the detection includes obtaining (e.g., using obtain instruction code 300) an instruction, such as a cipher instruction (e.g., a cipher message instruction) or another instruction, and executing 410 the instruction (e.g., using execute instruction code 330) to determine the operation/function to be performed. In another example, the detecting is performed by decoding one or more of the operands of an obtained instruction prior to executing the instruction. Other examples are possible.

Based on detecting the selected cryptographic function, in one example, process 400 obtains 412 operands and/or information of the instruction (e.g., using obtain operands code 332). For instance, process 400 obtains the opcode, a function code and a modifier control of the instruction to determine the operation/function to be performed, such as a full XTS encryption function. For instance, the opcode is read from an operation code field of the instruction and the function code and modifier control are obtained from, e.g., a register used by the instruction. Further, in one example, process 400 reads a source value (e.g., a message to be encrypted or decrypted) and a length of the source from, e.g., one or more registers specified by the instruction; and obtains (e.g., reads) one or more cryptographic keys (e.g., key 1 (K1), key 2 (K2)) and a confidential value (e.g., tweak value) from, e.g., a parameter block that is input to the instruction. Other examples are possible. Additional, fewer and/or other operands/information may be obtained using the instruction and/or the operands/information may be obtained from additional, fewer and/or other locations.

Based on obtaining the operands/information, process 400 performs 414 an encryption operation of the confidential data (e.g., tweak value). For instance, an AES-ECB (Advanced Encryption Standard-Electronic Code Book) encryption operation is performed to encrypt the confidential data (e.g., the tweak value) using key 2.

In one example, based on obtaining the operands/information, the hardware is initialized to be able to perform operations of the instruction. For example, initially, internally within the hardware, a micro-operation of the instruction is selected to perform an operation, such as a plain encryption operation of a confidential value (e.g., a tweak value). For the micro-operation, the length of the source value (e.g., confidential value, such as the tweak value) is set to a selected value (e.g., 16 bytes); and a value of a protected key (e.g., a key (key 2) used to encrypt the confidential data (e.g., tweak value)) and the confidential value (e.g., tweak value) are read. The hardware encrypts the confidential value providing an encrypted confidential value (e.g., encrypted tweak value).

Process 400 obtains 416 the encrypted confidential value (e.g., encrypted-tweak value), as well as a parameter to be used in cryptographic processing (e.g., encryption or decryption), such as a power block sequencing value (e.g., a next alpha power). For instance, process 400 reads the next alpha power value from a parameter block that is input to the instruction. Further, process 400 generates 418 a mask value (e.g., TAU), by, e.g., computing a product on a dedicated multiplier for Galois Field (GF)(2) arithmetic. For instance, the encrypted tweak value is multiplied by the next alpha power obtained from the parameter block to produce a mask value, referred to herein as TAU. In one example, the multiplication operation is performed over Galois field (GF) $2^{128}$.

Process 400 performs 420 a cipher operation, such as an encryption operation (also referred to as an encipher operation), on one or more of the message blocks using, e.g., the mask value, key 1 and the plaintext to produce enciphered data (e.g., one or more ciphertext blocks). The enciphering continues until all the message blocks have been enciphered or the instruction is interrupted.

In another example, the cipher operation includes a decryption operation (also referred to as a decipher operation) performed on one or more of the message blocks using, e.g., the mask value, key 1 and ciphertext to produced deciphered data (e.g., one or more plaintext blocks). The deciphering continues until all the message blocks have been deciphered or the instruction is interrupted.

In one example, based on generating the mask, the hardware receives the mask value, e.g., an AES-XTS mask or TAU, and selects a micro-operation of the instruction to perform a chosen cipher operation (e.g., an encryption operation or a decryption operation) using the mask value. Based on the selected micro-operation, the source length of the message to be encrypted/decrypted is read from one or more registers (e.g., accelerator registers) input to the instruction, as well as the message. Additionally, in one example, key 1, which was obtained from the parameter block input to the instruction, is read. In one example, the message includes a plurality of message blocks (e.g., a plurality of plaintext blocks or ciphertext blocks). The micro-operation is performed.

In one example, prior to ending the instruction either due to full completion of the cryptographic process (e.g., instruction ends with a condition code of zero) or partial completion of the cryptographic process (e.g., instruction ends with a condition code of three), process 400 updates 422 selected state of the instruction, such as the power block sequencing value (e.g., next alpha power).

Process 400 determines 430 if the cryptographic processing was interrupted. For instance, process 400 determines whether execution of the instruction completed with a selected condition code (e.g., condition code 3). If, for instance, execution of the instruction is interrupted prior to completion of the encryption/decryption of the source message, process 400 saves 432 the selected state (e.g., the power block sequencing value (e.g., next alpha power)) to be used on re-execution of the instruction to continue the encryption/decryption operation from where it was interrupted. In one example, it is saved in the parameter block (or other selected location). However, if process 400 does not detect that the cipher instruction has been interrupted, then the instruction is complete for the entire source length and a condition code of, e.g., zero is set. Other examples are possible.

Further, in one example, process 400 saves 434 the final state (e.g., a final value of the power block sequencing value (e.g., next alpha power) in, e.g., the parameter block or other location. Moreover, in one example, process 400 provides 436 a result of the cipher operation (e.g., plaintext, ciphertext, etc.). For instance, an operand (e.g., first operand) of the instruction is provided that includes the result. Other examples are possible.

In one example, the saving of the selected state may occur prior to determining that the instruction execution was interrupted. For instance, it may be saved at the time of updating. Other examples are possible.

In one or more aspects, as described herein, an initial mask value (e.g., TAU) is generated for a first input message block (e.g., a first plaintext block for an encryption operation or a first ciphertext block for a decryption operation), and the mask value is updated for subsequent input message blocks. The initial mask value is generated, in one example, using the input tweak value (which is encrypted, in one example).

The generated mask value for each input message block is used as input for ciphering (encrypting or decrypting) each input message block. The purpose of the encrypted tweak value is to prevent multiple data blocks on the storage device having the same content from producing the same cipher text.

In one example, since the instruction and/or its function that performs the cipher technique is interruptible (e.g., the technique processing may be terminated before the entire cipher technique computation is complete (partial completion) by the machine), in accordance with one or more aspects of the present disclosure, and may be re-issued by the program such that the machine may resume processing the cipher technique from where it stopped processing, the mask value is to be saved and provided as input to the machine. This would allow the machine to resume processing the cipher technique from where it stopped processing from the previous time. However, saving the mask value, such as in a parameter block input to the instruction, opens the possibility of an unauthorized access to the mask value, which may provide unauthorized access to the confidential value (e.g., tweak value) based on the knowledge of the mask value and other cipher technique parameters. If unauthorized access to the confidential value occurs, the protection that is provided by the unique confidential value in the cipher technique is lost, and the unauthorized user can use a function to compute the same input message blocks. Therefore, it is beneficial to protect the encrypted confidential value. Thus, in accordance with one or more aspects of the present disclosure, a capability is provided that is fast, efficient, and protects the encrypted confidential value and the mask value from being exposed in the parameter block (or other location) and thereby, prevents an unauthorized user from observing the encrypted confidential value while processing the entire cipher technique using multiple iterations of the same instruction and its function.

Further details relating to one or more aspects of the cryptographic processing, including protection processing for, e.g., the encrypted confidential value (e.g., encrypted tweak value) and/or the mask value, are described with reference to FIG. 4B. In one example, a protection process 450 (also referred to herein as process 450) used to perform the protection processing is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; one or more hardware accelerators separate and/or part of one or more processors and/or processing circuitry; and/or other computing devices, etc.). Additional and/or other computers, servers, devices, processors, nodes, processing circuitry, accelerators and/or computing devices may be used to execute the processing and/or aspects thereof. Many examples are possible.

In one example, process 400 and process 450 are one process; in other examples, they are separate processes. In one example, the processing of FIG. 4B is part of executing the instruction and/or related thereto.

Referring to FIG. 4B, in one example, process 450 obtains (as part of executing the instruction) deviated input parameters (e.g., key 1 (K1), key 2 (K2), confidential value (e.g., tweak value) and power block sequencing value (e.g., NAP)) from, e.g., a parameter block (or other location) input to an instruction (e.g., cipher instruction or other instruction) to be executed by a computing device (e.g., a central processing unit). In one example, a program provides one or more of the parameters of the parameter block. As an example, the program determines a power block sequencing value (e.g., next alpha power (NAP)) for a first message block of an input message of an instruction (e.g., cipher instruction or other instruction) and provides it for input in the parameter block.

In one example, process 450 (as part of executing the instruction) encrypts 456 the confidential value (e.g., tweak value) using a protected key (e.g., tweak key (e.g., K2)) and an AES encryption technique to obtain an encrypted confidential value (e.g., an encrypted tweak value). Process 450, as part of executing the instruction, multiplies 458, in one example, the encrypted tweak value (e.g., encrypted confidential value) by the power block sequencing value (e.g., NAP) to generate an initial mask value (e.g., TAU) for internal use by the hardware (i.e., it is not external to the hardware or central processing unit).

Based on performing a cipher operation (e.g., encipher, decipher) on a message block of a message specified by the instruction, in one example, process 450, as part of executing the instruction, updates 460 the power block sequencing number (e.g., NAP). For instance, the processor multiplies the current power block sequencing number (e.g., NAP) by the value of 2 in Galois Field ($2^{128}$) to obtain the updated power block sequencing value for the next message block. This is repeated for each message block in which cryptographic processing (e.g., a cipher operation) is performed during execution of the instruction.

Process 450 saves 462 the updated power block sequencing value in the parameter block for the next message block before ending the function/instruction processing with either a condition code indicating completion of the cryptographic processing of the message (e.g., CC=0) or a condition code indicating incomplete cryptographic processing of the message (e.g., CC=3). Process 450 determines 470 whether the condition code resulting from execution of the instruction indicates partial completion (i.e., the instruction was interrupted prior to completion of the cryptographic processing of the message). If the instruction ends with completion (e.g., CC=0), then processing is complete. Otherwise, if process 450 determines that the instruction was interrupted (e.g., CC=3), processing continues with process 450 obtaining (e.g., based on re-execution of the instruction) one or more input parameters from, e.g., a parameter block input to the instruction to re-execute the instruction from where it was interrupted. The updated input parameters include, at least, the updated power block sequencing value.

In one or more aspects, the program determines the power block sequencing value for the first cipher input message block and provides it in a parameter block that is input to an instruction. When the instruction executes and the ciphering starts from the first input message block on the disk, a sequential number, J, is, e.g., zero, which equates, in one example, to a power block sequencing value of, e.g., one. When J is, e.g., zero, no calculation is performed by the program which yields maximum performance. The program also provides deviated input parameters (e.g., a tweak value) in the parameter block. The input parameters also include, in one example, key 1 (data key) and key 2 (tweak key). Other examples are possible.

In another example, instead of key 1 and key 2, the input parameters include an encrypted double-key provided as a single encrypted key. If a single encrypted double-key is provided, the processor decrypts the encrypted double-key to obtain the tweak key (e.g., key 2). The processor encrypts the tweak value using the tweak key and the cipher technique and obtains the encrypted tweak value. The processor then multiplies the encrypted tweak value by a power block sequencing value (e.g., NAP) to produce an initial mask value (e.g., TAU). The calculated initial mask value is not stored anywhere outside the hardware's secure storage to protect the encrypted tweak value (e.g., from software, unauthorized users, etc.).

After each input message block is ciphered, in one example, the processor multiplies the current power block sequencing value by, e.g., a value of 2 in Galois Field ($2^{128}$) to obtain the power block sequencing value for the next block. This step is repeated until the last input message block is ciphered (ending the function processing of the instruction with a condition code, e.g., zero), or the machine terminates the instruction and its function prematurely with partial completion (ending the function processing of the instruction with a condition code, e.g., three). If the machine terminates the instruction and its function prematurely with partial completion, the machine determines (e.g., calculates) the power block sequencing value for the next input message block and saves it as the power block sequencing value in the parameter block. For this case, the program provides the machine with the ability to continue processing the cipher algorithm from the previous partial completion point. In one example, the calculated next mask value is not stored anywhere outside of the hardware's secure storage to protect the encrypted tweak value from software. Only the next power block sequencing value, in this example, is stored in the parameter block which does not diminish the encrypted tweak value protection because the next power block sequencing value does not include the encrypted tweak value. Therefore, saving the next power block sequencing value in the parameter block provides both the saved state of the instruction execution for resumption of the technique processing and protects the encrypted tweak value, at the same time.

As indicated above, the cryptographic processing, including accelerated processing, interruptible processing and/or the protection processing, uses a cipher instruction. One particular example of a cipher instruction is a Cipher Message instruction. In one example, a cipher instruction, such as the Cipher Message instruction, is a single architected hardware machine instruction at the hardware/software interface. As an example, it is part of an instruction set architecture. One example of an instruction set architecture to incorporate and/or use a cipher instruction, such as a Cipher Message instruction, and/or aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

Figures 5A, 5B, 5C, 5D, 5E, 5F, 5G:
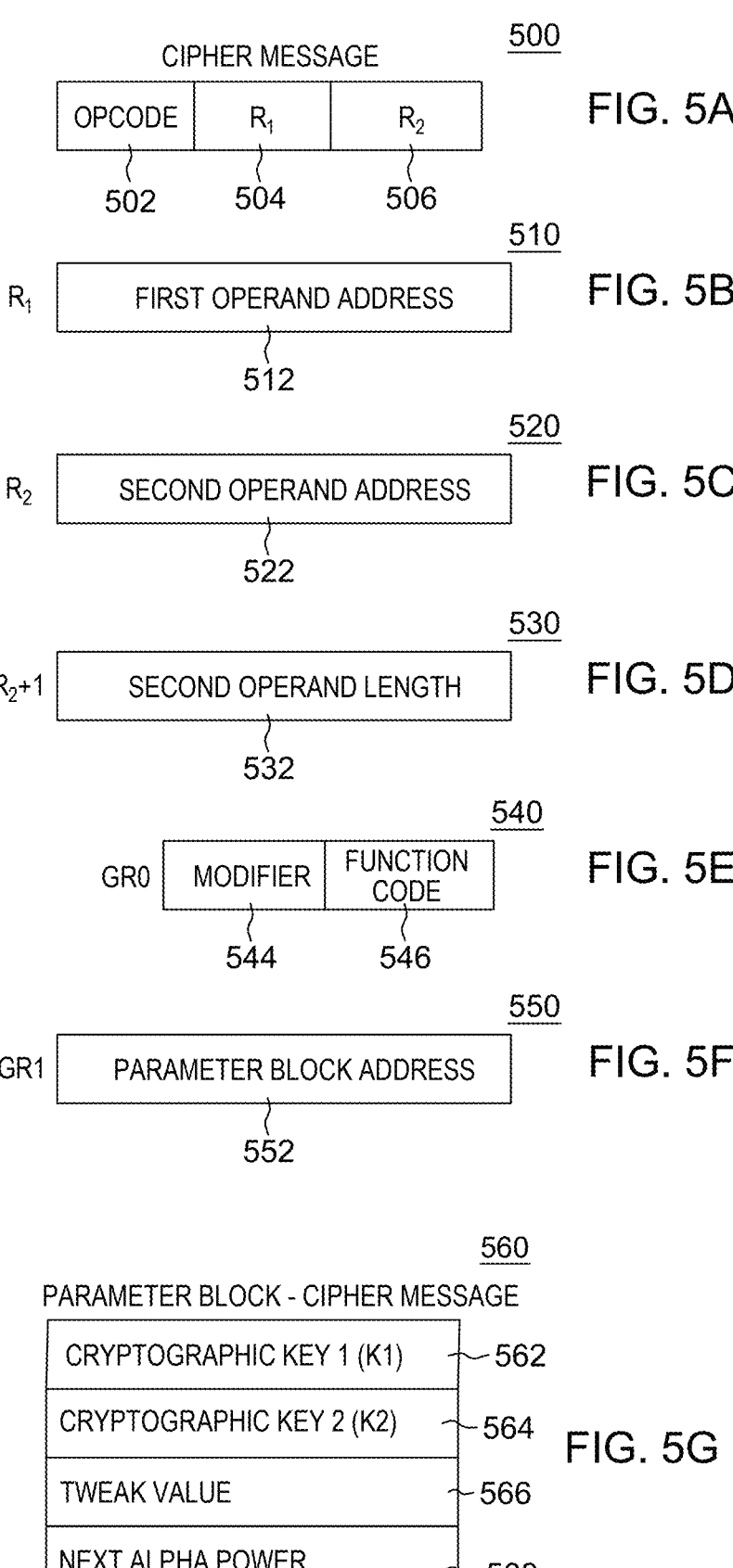
FIG. 5A depicts one example of a format of a Cipher Message instruction, in accordance with one or more aspects of the present disclosure.
FIGS. 5B-5D depict examples of contents of registers used by the Cipher Message instruction of FIG. 5A, in accordance with one or more aspects of the present disclosure.
FIGS. 5E-5F depict examples of contents of general registers used by the Cipher Message instruction of FIG. 5A, in accordance with one or more aspects of the present disclosure.
FIG. 5G depicts one example of a parameter block used by the Cipher Message instruction of FIG. 5A, in accordance with one or more aspects of the present disclosure.

Referring to FIG. 5A, in one example, a Cipher Message instruction 500 has a format, referred to as a register and register with an extended opcode format, having, e.g., 32 bits, and includes, for instance, an operation code (opcode) field 502 (e.g., bits 0-15); one register field ($R_1$) 504 (e.g., bits 24-27); and another register field ($R_2$) 506 (e.g., bits 28-31). Although in this example there is one opcode field 502, in other examples, there may be more than one opcode field. For instance, there may be one opcode field at the beginning of the instruction format and one opcode field at the end of the instruction format. Other examples are also possible.

In one example, referring to FIGS. 5A and 5B, register field ($R_1$) 504 specifies a register 510 ($R_1$) that includes a first operand address 512 of a first operand of the instruction. Further, in one example, referring to FIGS. 5A and 5C, register field ($R_2$) 506 specifies a register 520 ($R_2$) that includes a second operand address 522 of a second operand of the instruction. Referring to FIG. 5D, another register 530 ($R_2$+1) includes a length 532 of the second operand.

In one example, the $R_1$ field designates a general register and is to designate an even-numbered register other than, e.g., general register 0; otherwise, a specification exception is recognized, in one example. The $R_2$ field designates, in one example, an even-odd pair of general registers and is to designate an even-numbered register other than, e.g., general register 0. In other examples, other types of registers other than general registers may be used. Further, registers other than even-numbered registers may be used. Many examples are possible.

In one example, the location of the leftmost byte of the first and second operands is specified by the contents of the $R_1$ and $R_2$ general registers, respectively. The number of bytes in the second operand location is specified in, e.g., general register $R_2$+1. The first operand is the same length as the second operand, in one example.

As part of the operation, the addresses in general registers $R_1$ and $R_2$ are incremented by the number of bytes processed and the length in general register $R_2$+1 is decremented by the same number. The formation and updating of the addresses and length is dependent on, for instance, the addressing mode.

In, for instance, the 24-bit addressing mode, the contents of bit positions 40-63 of general registers $R_1$ and $R_2$ constitute the addresses of the first and second operands, respectively, and the contents of bit positions 0-39 are ignored; bits 40-63 of the updated addresses replace the corresponding bits in general registers $R_1$ and $R_2$, carries out of, e.g., bit position 40 of the updated addresses are ignored, and the contents of bit positions 32-39 of general registers $R_1$ and $R_2$ are set to, e.g., zeros. In the 31-bit addressing mode, the contents of bit positions 33-63 of general registers $R_1$ and $R_2$ constitute the addresses of the first and second operands, respectively, and the contents of bit positions 0-32 are ignored; bits 33-63 of the updated addresses replace the corresponding bits in general registers $R_1$ and $R_2$, carries out of, e.g., bit position 33 of the updated addresses are ignored, and the content of bit position 32 of general registers $R_1$ and $R_2$ is set to zero. In the 64-bit addressing mode, the contents of bit positions 0-63 of general registers $R_1$ and $R_2$ constitute the addresses of the first and second operands, respectively; bits 0-63 of the updated addresses replace the contents of general registers $R_1$ and $R_2$, and carries out of, e.g., bit position 0 are ignored. Other examples are possible.

In both the 24-bit and the 31-bit addressing modes, the contents of bit positions 32-63 of general register $R_2$+1 form a 32-bit unsigned binary integer which specifies the number of bytes in the first and second operands, and the contents of bit positions 0-31 are ignored; bits 32-63 of the updated value replace the corresponding bits in general register $R_2+1$. In the 64-bit addressing mode, the contents of bit positions $0$-$63$ of general register $R_2+1$ form a 64-bit unsigned binary integer which specifies the number of bytes in the first and second operands; and the updated value replaces the contents of general register $R_2+1$.

In the 24-bit or 31-bit addressing mode, the contents of bit positions $0$-$31$ of general registers $R_1$, $R_2$, and $R_2+1$, remain unchanged, in one example.

In the access register mode, access registers 1, $R_1$ and $R_2$ specify the address spaces containing the parameter block, first and second operands, respectively.

Further, in one example, the Cipher Message instruction uses multiple implied general registers, such as general register 0 (GR0) and general register 1 (GR1). These registers are referred to as implied registers since they are not explicitly referenced by one or more fields of the instruction; however, they are used by the instruction. Examples of the registers are described below.

In one example referring to FIG. 5E, a general register 0 (540) includes, for instance:

Modifier 544 (e.g., bit 56): In one example, when the function code (e.g., bits 57-63 of general register 0) is, e.g., nonzero, modifier field 544 (e.g., bit 56) includes a modifier control (e.g., modifier bit) indicating encryption or decryption is to be performed by the function. When modifier field 544 is, e.g., zero, the function performs encryption of the second operand (e.g., the value obtained using $R_2$); when modifier field 544 is, e.g., one, the function performs decryption of the second operand; and Function code 546 (e.g., bits 57-63): In one example, function code field 546 includes the function code that specifies a function to be performed by the Cipher Message instruction. The instruction is configured to specify and implement a plurality of functions and respective function codes. An example function code to be used, in accordance with one or more aspects of the present disclosure, includes, for instance, a function code (e.g., function code 82) that specifies for the cipher message instruction, e.g., a cipher message full XTS AES 128 function, etc. Although example functions and/or function codes may be specified, additional, fewer and/or other functions/function codes may be specified and/or used. Many examples are possible.

In one example, based on the function code (e.g., all function codes except the query function code), the second operand is ciphered (e.g., enciphered or deciphered) as specified by the function code using a cryptographic key in the parameter block, and the result is placed in the first operand location.

Further, in one example, selected bits, e.g., one or more bits $0$-$55$ of general register 0 are ignored, depending on the selected function code. This is only one example. In other examples, one or more bits or no bits are to include a specific value, such as zero. Further, in other examples, values other than zero may be used. Many examples are possible. For example, when the Cipher Message instruction Cipher Message Full XTS AES 128 function is specified, bit positions $0$-$31$ of general register 0 are ignored and bit positions $32$-$55$ of general register 0 are reserved and are to contain a selected value, such as zeros; otherwise, the program may not operate compatibly in the future. Other examples are possible for the instruction, as well as for each function of the instruction.

One example of general register 1 is depicted in FIG. 5F. In one example, a general register 1 (550) includes an address 552 of a parameter block in storage (e.g., memory, storage, etc.). For instance, address 552 is a logical address of, for instance, a leftmost byte of the parameter block in storage. In one example, the location of the address in the general register depends on the addressing mode. For instance, in the 24-bit addressing mode, the contents of bit positions 40-63 of general registers 1 constitute the address, and the contents of bit positions 0-39 are ignored. In the 31-bit addressing mode, the contents of bit positions 33-63 of general register 1 constitute the address and the contents of bit positions 0-32 are ignored. In the 64-bit addressing mode, the contents of bit positions 0-63 of general register 1 constitute the address. In the access register mode, access register 1 specifies the address space containing the parameter block. Other examples are possible.

One example of a parameter block used by the Cipher Message Full XTS AES 128 function is described with reference to FIG. 5G. In one example, a parameter block, e.g., parameter block 560, used by the Cipher Message Full XTS AES 128 function includes, for instance, a cryptographic key 1 (K1) 562 (e.g., byte offsets 0-15); a cryptographic key 2 (K2) 564 (e.g., byte offsets 16-31); a tweak value (i) 566 (e.g., byte offsets 32-47; an example of a confidential value); and a next alpha power (NAP) 568 (e.g., byte offsets 48-63; an example of a power block sequencing value). In one example, the tweak value and the next alpha power are in, e.g., little endian format. However, in one example, the, e.g., 8 bits in each byte of the parameter block are not in bit-reversed format, i.e., the leftmost bit of the byte is bit 0 and the rightmost bit of the byte is bit 7. Further, in one example, the 128-bit cryptographic key 1 (K1), a.k.a., data key, and the 128-bit cryptographic key 2 (K2), a.k.a., protected or tweak key, pair are, e.g., in byte offsets 0-31 of the parameter block. Additional, fewer and/or other information is possible, as well as other examples and variations.

In one example, in execution of the instruction and specified function, the second operand is ciphered as specified by the function code (and, e.g., modifier) using a cryptographic key in the parameter block (e.g., key 1), and the result is placed in the first operand location. The ciphering uses the next alpha power (an example of a power block sequencing value) provided in the parameter block, and the next alpha power is updated as part of the operation and instruction execution, as described herein.

Figures 6A, 6B:
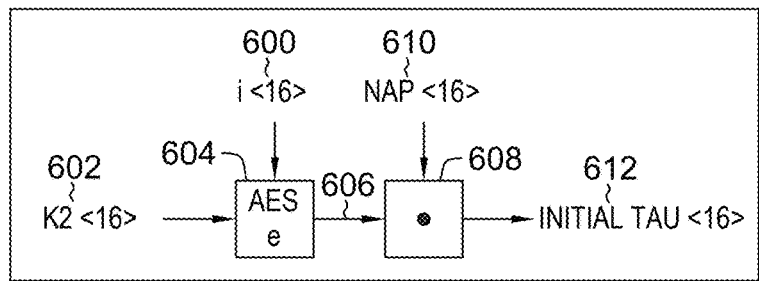
FIG. 6A depicts one example of a compute operation performed in accordance with one or more aspects of the present disclosure.
FIG. 6B depicts one example of an encipher operation performed in accordance with one or more aspects of the present disclosure.

In one example, as shown in FIG. 6A, in execution of one or more functions of the Cipher Message instruction, the 128-bit tweak value (i) 600 is encrypted using the 128-bit tweak key (K2) 602 and the AES encryption algorithm (AES e) 604, and the result 606 (e.g., encrypted tweak value) is multiplied 608 by the next alpha power (NAP) 610 (also referred to as power block sequencing value) to produce an initial TAU 612 (e.g., an XTS parameter; also referred to as a mask value). The multiplication operation is performed over GF ($2^{128}$), in one example. This is one example of the processing performed in steps 414-418 of FIG. 4A or steps 456-458 of FIG. 4B.

In one example, when the modifier (M) bit in general register 0 is, e.g., zero, an encipher operation is performed. In one example, as depicted in FIG. 6B, the 16-byte plaintext blocks (P1, P2, . . . , Pn) 620 (also referred to herein as message blocks) in operand 2 are enciphered using the AES-encryption algorithm (AES e) 622, as an example.

Except for the first message block, the TAU used for the current message block is the TAU from the previous block multiplied 644 by the value of 2 (646) in GF ($2^{128}$). To encrypt the first block of plaintext, the initial TAU 640 (e.g., initial TAU 612) is used.

Except for the first message block, the next alpha power (NAP) used for the current message block is the next alpha power (NAP) 632 from the previous message block multiplied 634 by the value of 2 (636) in GF ($2^{128}$). For the first block of plaintext, the initial next alpha power (NAP) 630 from the parameter block (e.g., next alpha power 568 of FIG. 5G) is used.

In one example, as depicted in FIG. 6B, the TAU for each block is exclusive-ORed ($\oplus$) 650 with the corresponding plaintext (P) block 620. The result of the exclusive-OR operation is then encrypted (e) 622 using the AES-encryption algorithm with the 128-bit data key (K1) 652. The result of the encryption operation is exclusive-ORed 654 with the TAU (e.g., 640, 642 multiplied 644 by 646, respectively) to produce the ciphertext (C) block 658. The next alpha power (NAP) for the current message block is multiplied by the value of 2 in GF ($2^{128}$) to obtain the next alpha power (NAP) for the next message block.

The ciphertext blocks (C1, C2, . . . , Cn) are stored in operand 1, as one example.

Figure 6C:
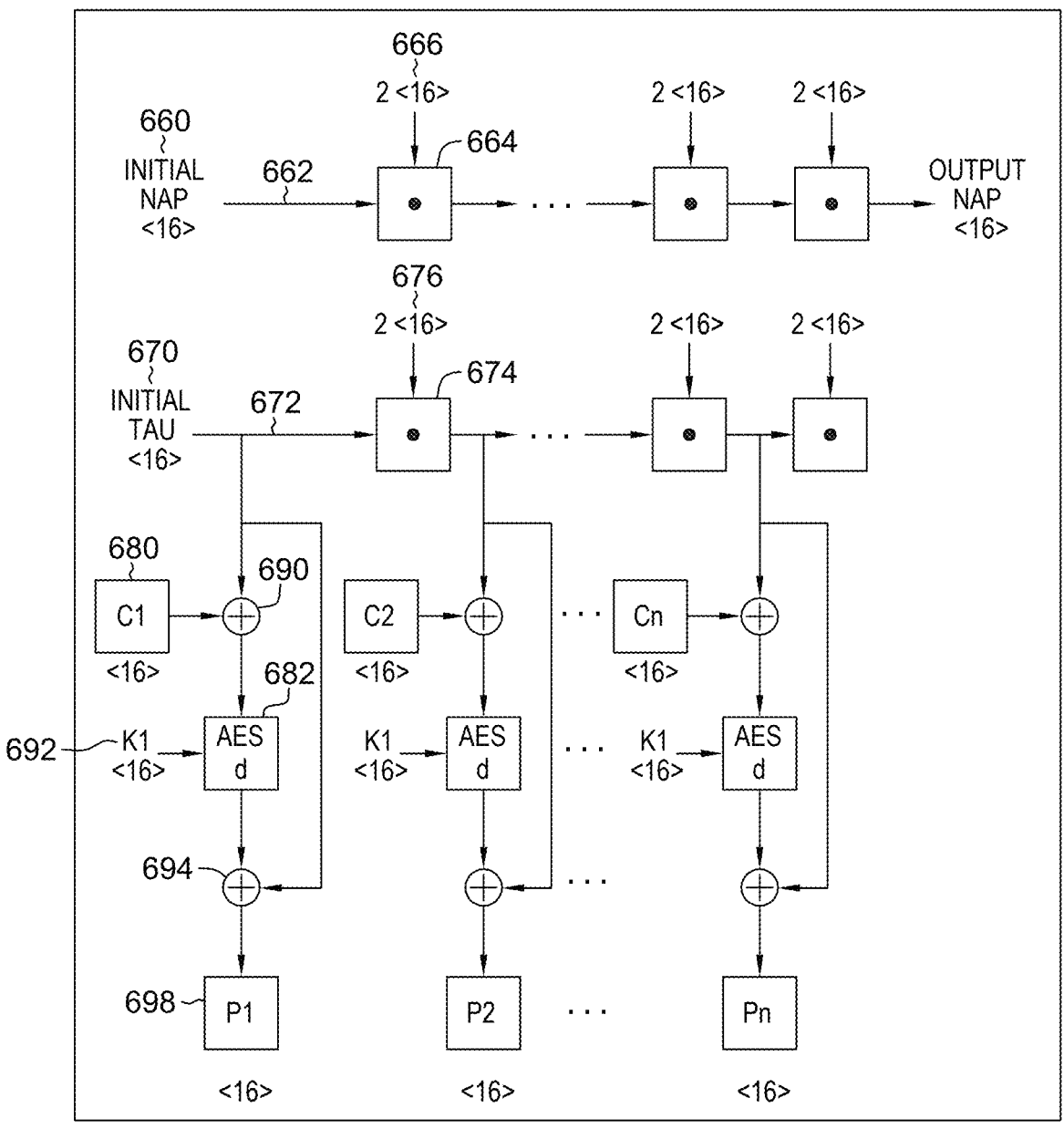
FIG. 6C depicts one example of a decipher operation performed in accordance with one or more aspects of the present disclosure.

When the modifier bit in general register 0 is, e.g., one, a decipher operation is performed. In one example, as depicted in FIG. 6C, the 16-byte ciphertext blocks (C1, C2, . . . , Cn) 680 (also referred to herein as message blocks) in operand 2 are deciphered using the AES-decryption algorithm (AES d) 682.

Except for the first message block, the TAU used for the current message block is the TAU 672 from the previous block multiplied 674 by the value of 2 (676) in GF ($2^{128}$). To decrypt the first message block of ciphertext, the initial TAU 670 is used.

Except for the first message block, the next alpha power (NAP) used for the current message block is the next alpha power (NAP) 662 from the previous block multiplied 664 by the value of 2 (666) in GF ($2^{128}$). For the first message block of ciphertext, the initial next alpha power (NAP) 660 from the parameter block is used.

In one example, the TAU for each block is exclusive-ORed (690) with the corresponding ciphertext block (680). The result of the exclusive-OR operation is then decrypted (682) using the AES-decryption algorithm with the 128-bit data key (K1) (692). The result of the decryption operation is exclusive-ORed (694) with the TAU (670, or 672 multiplied 674 by 676, respectively) to produce the plaintext block (698). The next alpha power (NAP) for this block is multiplied by the value of 2 in GF ($2^{128}$) to obtain the next alpha power (NAP) for the next block.

The plaintext blocks (P1, P2, . . . , Pn) are stored in operand 1, as one example.

The processing of the function completes after the last input text (message) block is ciphered and a select condition code (e.g., condition code 0) is set. When the operation ends due to partial completion, a select condition code (e.g., condition code 3) is set. The result of the final next alpha power (NAP) multiplication, called the output next alpha power, is stored into the next alpha power (NAP) field of the parameter block, in one example.

Example resulting condition codes for the Cipher Message instruction include, for instance: 0 Normal completion; 1 Verification-pattern mismatch; 2-; 3 Partial completion.

In one example, the result is obtained as if processing starts at the left end of both the first and second operands and proceeds to the right, block by block. The cipher operation is ended when the number of bytes in the second operand as specified in general register $R_2+1$ have been processed and placed at the first operand location or when a central processing unit determined number of blocks that is less than the length of the second operand have been processed. The central processing unit determined number of blocks depends on the model, and may be a different number each time the instruction is executed. The central processing unit determined number of blocks is typically, e.g., nonzero. In certain unusual situations, this number may be zero, and a select condition code (e.g., condition code 3) may be set with no progress. However, the central processing unit protects against endless reoccurrence of this no-progress case.

The results in the first operand location and the next alpha power field are unpredictable if, e.g., any of the following situations occur: The cryptographic key field or the encrypted cryptographic key field overlaps any portion of the first operand; the next alpha power field overlaps any portion of the first operand or the second operand; the first and second operands overlap destructively. Operands are said to overlap destructively when the first operand location would be used as a source after data would have been moved into it, assuming processing to be performed from left to right and one byte at a time.

As examples, normal completion occurs when the cipher operation has ended. Partial completion occurs when a central processing unit determined number of blocks that is less than the length of the second operand have been processed.

When the operation ends due to normal completion, condition code, e.g., 0 is set and the resulting value in $R_2+1$ is, e.g., zero. When the operation ends due to partial completion, condition code, e.g., 3 is set. In this case, in one example, if the central processing unit is enabled to update counters in, e.g., a cryptography counter set, all of the second operand has been processed, and the appropriate counter is not accessible, then the resulting value placed in general register $R_2+1$ is zero; otherwise, the resulting value placed in general register $R_2+1$ is nonzero.

In one example, a PER (program event recording) storage alteration event may be recognized both for the first operand location and for the portion of the parameter block that is stored. A PER zero address detection event may be recognized for the first and second operand locations and for the parameter block. When PER events are detected for one or more of these locations, it is unpredictable which location is identified in the PER access identification and PER ASCE (address space control element) ID (identifier).

When a storage alteration PER event is recognized, fewer than 4K additional bytes are stored into the first operand locations before the event is reported, in one example.

When the second operand length is initially zero, the following occurs, in one example. The parameter block, first, and second operands are not accessed, and general registers $R_1$, $R_2$, and $R_2+1$ are not changed. If the central processing unit is not enabled to update counters in the cryptography counter set, then condition code, e.g., 0 is set. If the central processing unit is enabled to update counters in the cryptography counter set, and the appropriate counter is accessible, then the appropriate counter is updated and condition code, e.g., 0 is set. If the central processing unit is enabled to update counters in the cryptography counter set, and the appropriate counter is not accessible, then the condition code remains unchanged and an access exception is recognized for the location of the appropriate counter.

When the contents of the $R_1$ and $R_2$ fields are the same, the contents of the designated registers are incremented only by the number of bytes processed, not by twice the number of bytes processed.

As observed by this central processing unit, other central processing units, and channel programs, references to the parameter block and storage operands may be multiple-access references, accesses to these storage locations are not necessarily block-concurrent, and the sequence of these accesses or references is undefined.

In certain unusual situations, instruction execution may complete by setting a selected condition code (e.g., condition code 3) without updating the registers and the chaining value (e.g., power block sequencing value) to reflect the last unit of the first and second operands processed. The size of the unit processed in this case depends on the situation and the model but is limited such that the portion of the first and second operands which have been processed and not reported do not overlap in storage. In one example, in, e.g., all cases, change bits are set and PER storage alteration events are reported, when applicable, for the first operand locations processed.

For functions that perform a comparison of the wrapping key verification pattern field in a parameter block (provided with those functions) with the wrapping key verification pattern register, it is unpredictable whether access exceptions and PER zero address detection events are recognized for the first and second operands when the comparison results in a mismatch.

Access exceptions may be reported for a larger portion of an operand than is processed in a single execution of the instruction; however, access exceptions are not recognized for locations beyond the length of an operand nor for locations more than, e.g., 4K bytes beyond the current location being processed. In one or more examples, for full XTS functions, the entire parameter block may be tested for store-type accesses even though part of it may not be stored. For all other functions, only the portion of the parameter block that is stored may be tested for store-type accesses.

Example program exceptions that may occur during execution of the Cipher Message instruction include, for instance: Access (fetch, operand 2, cryptographic key, and cryptographic key 1, cryptographic key 2, wrapping-key verification pattern, and tweak value; store, operand 1; fetch and store, chaining value, XTS parameter, next alpha power (NAP), and cryptography counter); Operation (if the message-security assist is not installed); Specification; Transaction constraint.

One example of execution priority is indicated below:

1.-6. Exceptions with the same priority as the priority of program-interruption conditions for the general case.

7.A Access exceptions for second instruction halfword.

7.B Operation exception.

7.C Transaction constraint

8. Specification exception due to invalid function code or invalid register number.

9. Specification exception due to invalid operand length.

10. Access exceptions for an access to a cryptography counter and second-operand length originally zero.

11. Condition code 0 due to second-operand length originally zero.

12.A.1 Access exceptions for an access to the parameter block.

12.A.2. Condition code 1 due to verification-pattern mismatch.

12.B Access exceptions for an access to the first, or second operand.

13. Condition code 3 due to partial completion (second-operand length still nonzero).

14. Condition code 3 due to second-operand length stepped to zero and access-exception condition detected for an access to a cryptography counter.

15. Condition code 0 due to normal completion (second-operand length originally nonzero, but stepped to zero).

In the description herein of a cipher instruction, such as a cipher message instruction (e.g., Cipher Message instruction 500), specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are used, other types of registers may be used. Other examples are possible.

Further, in one or more aspects, the parameter block depends on the function to be performed. As described herein, in one or more examples, the parameter block may include key 1, key 2, the tweak value and the next alpha power for, e.g., the cipher message full XTS AES 128 function; and for a cipher message full XTS encrypted AES 128 function, the parameter block includes an encrypted cryptographic key combining key 1 and key 2 (instead of key 1 and key), the tweak value, the next alpha power and an wrapping key verification pattern, as examples. Other examples of functions and/or parameter blocks are possible.

A cipher instruction, such as a Cipher Message instruction, may have additional, fewer and/or other fields. For instance, one or more fields of a cipher message instruction, such as Cipher Message instruction, may be optional. Many variations are possible.

Although various examples are provided for one or more formats of the instruction, additional and/or other formats may be used. Further, the processing may be used for other purposes than described herein.

Figure 7:
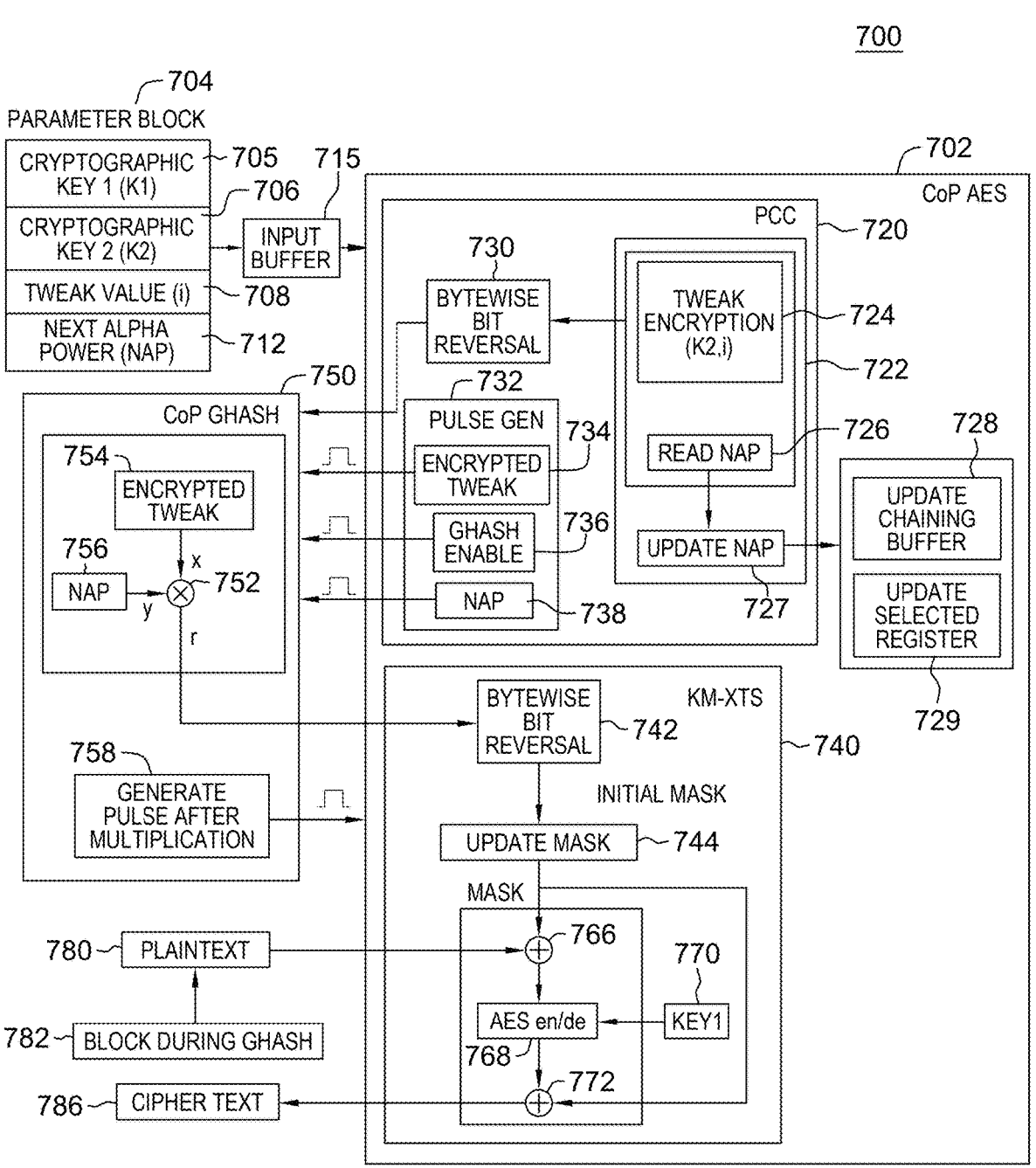
FIG. 7 depicts one example of hardware to perform cryptographic processing, including accelerated cryptographic processing and/or protection processing, in accordance with one or more aspects of the present disclosure.

One example of a hardware design to implement one or more aspects of the present disclosure is described with reference to FIG. 7. In one example, a computing environment 700 includes, a plurality of co-processors, including, for instance, one co-processor 702 (e.g., an encryption co-processor, such as an AES co-processor) coupled to another co-processor 750 (e.g., a GHASH co-processor). A co-processor is a computer processor used to supplement a primary processor, such as a central processing unit. In one example, a central processing unit (also referred to as a processor core) may include one more co-processors. The one or more co-processors may be one or more hardware accelerators. Many examples are possible.

In one example, co-processor 702 receives as input a parameter block 704, via, e.g., an input buffer 715, that includes, for instance, a cryptographic key 1 (K1) 705, a cryptographic key 2 (K2) 706, a tweak value 708, and a next alpha power 712. Co-processor 702 includes, for instance, a private compute core (PCC) 720 to encrypt the tweak value and a cipher unit 740 (e.g., cipher message (KM)-XTS) to encrypt or decrypt the message blocks (e.g., the plaintext blocks or the ciphertext blocks). Private compute core 720 includes, for instance, an encrypt unit 722 coupled to multiple other units including a bytewise bit reversal unit 730 and a pulse generator 732. Encrypt unit 722 includes an encrypt component 724 to encrypt the tweak value and a read next alpha power component 726 to read the next alpha power, an output of which is provided to an update component 727 to update the next alpha power. The updated next alpha power is provided, in one example, to an update chaining buffer 728 and used to update a selected register 729 (e.g., a selected special purpose register).

Pulse generator 732 includes, for instance, an encrypted tweak pulse 734 to provide an encrypted tweak signal; a GHASH enable pulse 736 to provide a signal to enable GHASH processing; and a next alpha power pulse 738 to provide a next alpha power signal. These enable signals are provided, for instance, to co-processor 750. Bytewise bit reversal 730 of the encrypted tweak value is also provided to the co-processor 750.

In one example, co-processor 750 receives as input output from bytewise bit reversal 730, and output from pulse generator 732 (e.g., encrypted tweak enable signal, GHASH enable signal and obtain next alpha power enable signal). Co-processor 750, based on one or more of the enable signals, multiplies 752 an encrypted tweak value 754 with a next alpha power value 756 to produce a product (e.g., a mask value (e.g., TAU)), which is input to encryption unit 740 of co-processor 702 based on an enable signal from a generate pulse after multiplication unit 758. For instance, the product is input to bytewise bit reversal unit 742 of encryption unit 740. The output of bytewise bit reversal unit 742 is input to an update mask unit 744, the output of which is a mask (e.g., TAU) that is input to an exclusive OR 766. Exclusive OR 766 also receives as input plaintext 780 (e.g., a plaintext block during GHASH 782), assuming an encipher operation and an exclusive OR is performed, an output of which is input to an encipher/decipher unit 768 that, in this case enciphers the output of exclusive OR using a data key 770 (e.g., key 1). The output of the encipher (the enciphered output) is input, in one example, to another exclusive OR 772.

Exclusive OR 772 also receives the output of update mask unit 744, which provides the mask. The exclusive OR is performed to produce an output of ciphered text 786.

In one or more aspects, the GF $2^{128}$ multiplier used for implementing the AES-XTS algorithm may also be re-used, i.e. the same underlying hardware may be used to perform multiplications used in the AES-GCM mode and the GHASH. However, the endianness of the input operands for AES-XTS does not match the endianness for GCM and GHASH, and therefore, additional hardware circuitry is provided that does a full-length byte-swap and a bit-reversal per byte on the input and output ports of the multiplier to allow the same multiplier to be reused across all the algorithms. This allows improvements in the area and power efficiency of the processor hardware.

In one or more aspects, a cryptographic processing capability is provided that includes an interruptible instruction to perform a cipher operation, including an accelerated cipher operation, without compromising security during the interruption or the resuming of the cipher operation. In one or more aspects, a protection capability is provided that protects the encrypted tweak value by not providing the power block sequencing value external to the hardware.

Figure 8A:
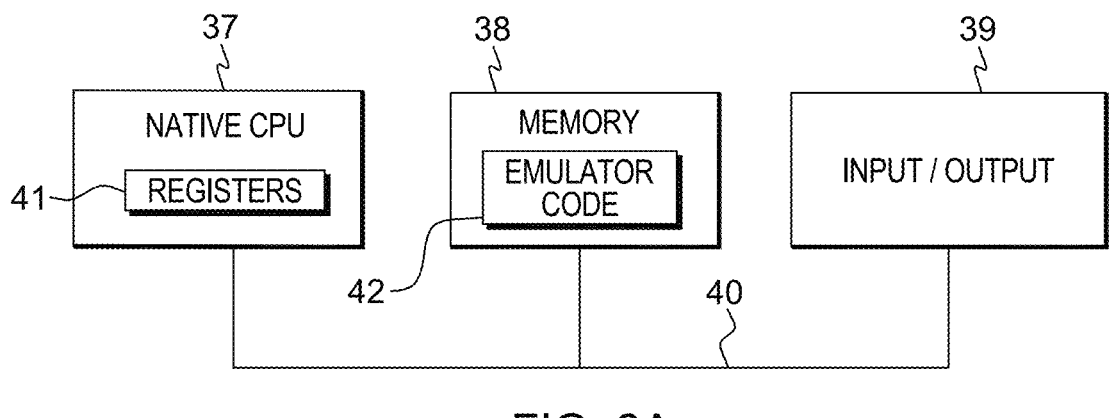
FIGS. 8A-8B depict another example of a computing environment to incorporate and use one or more aspects of the present disclosure.
Figure 8B:
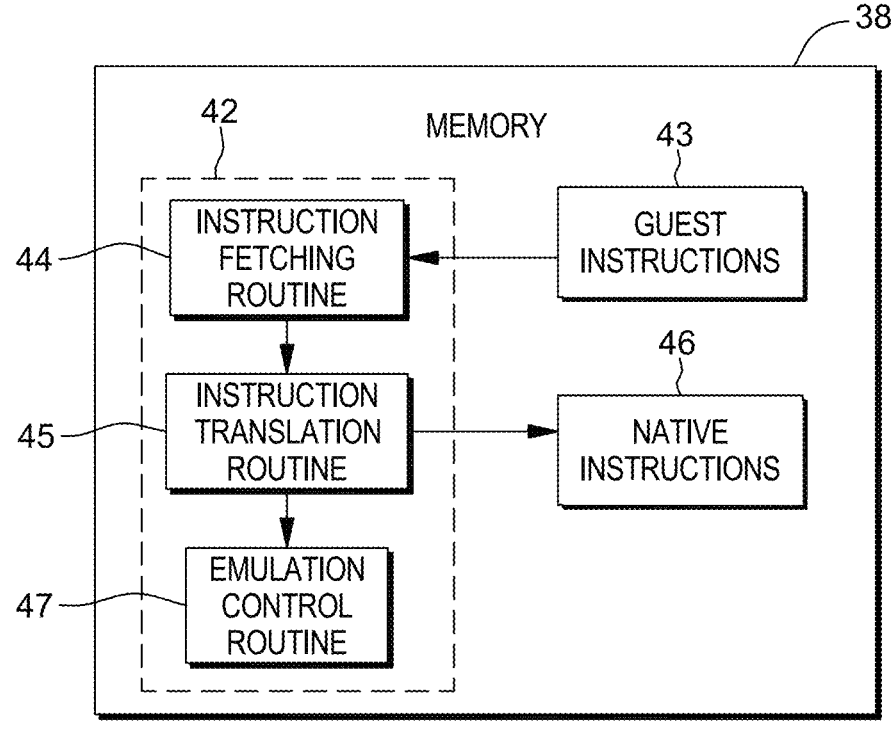

Although one or more examples of a computing environment to incorporate and use one or more aspects of the present disclosure are described herein, FIGS. 8A-8B depict another embodiment of a computing environment to incorporate and use one or more aspects of the present disclosure.

Referring, initially, to FIG. 8A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native central processing unit 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native central processing unit 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native central processing unit or by using locations in memory 38. In embodiments, guest instructions 43, native instructions 46 and emulator code 42 may reside in the same memory or may be disbursed among different memory devices.

An example instruction that may be emulated is the Cipher Message instruction described herein, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement accelerated cryptographic processing, including accelerated cryptographic processing, interruptible processing and/or protection processing and/or to perform one or more other aspects of the present disclosure.

One or more aspects of the present disclosure are tied to computer technology and facilitate processing within a computer, improving performance thereof. For instance, processing speed is increased and latency is reduced by using one instruction, e.g., one cipher instruction to perform the cryptographic processing. Further, security is enhanced by protecting the mask and tweak value used during the cipher operation and/or during interruption and resumption of the instruction used to perform the cipher operation. Processing within a processor, computer system and/or computing environment is improved.

In one or more aspects, a capability (e.g., an instruction, technique, etc.) is provided to accelerate encryption and decryption operations using a cipher technique, such as XTS-AES, in a processor core. In one or more aspects, the machine uses input parameters (e.g., key 1, key 2, power block sequencing value (NAP) in a parameter block), one or more of which are deviated parameters that are different from the inputs defined in the cipher technique. In one or more aspects, the same instruction and its function (e.g., a single instruction) is used to combine and process multiple parts of the cipher technique (e.g., encrypting the tweak value, performing a cipher operation on a message), instead of using two or more instructions and their functions. This accelerates performance.

In one or more aspects, the machine multiplies both the power block sequencing value and the mask value by a selected value, e.g., 2 (in GF $2^{128}$) to bypass lengthy calculations of deriving J (block sequential number) from the power block sequencing value, incrementing J by one (for the next input message block), then recalculating the power block sequencing value for the next input message block using exponent multiplication, and then calculating the mask value based on the calculated power block sequencing value. This improves processing speed.

In one or more aspects, the deviated state information or chaining value format are used to allow the interruption and resuming of the operation without compromising on security.

In one or more aspects, the technique can be applied to ciphering data for both data-at-rest and data-in-flight.

In one or more aspects, a block-wise mask is not exposed to the software, thereby enhancing security of the system. Further, security of the system is increased by wrapping a key to be used in cryptographic processing with a system key, which protects the key. In one or more aspects, key 1 and key 2 may be generated together as a combined, larger key, which is then decrypted to obtain key 2, which is used to encrypt the tweak value.

In one or more aspects, the encrypted tweak value of the cipher technique is protected from an unauthorized user using cryptographic techniques. In one or more aspects, the program initially provides at least one deviated input parameter (e.g., the power block sequencing value as an input parameter (e.g., in a parameter block)) instead of the machine calculating it, which is different than, e.g., the input defined for one or more cipher techniques, such as the XTS-AES technique.

In one or more aspects, the program determines an initial power block sequencing value and provides it in the parameter block. The machine determines each subsequent power block sequencing value until the machine determined partial completion point is reached. The machine determines the power block sequencing value for the next input message block and saves it as the output power block sequencing value in the parameter block. The machine terminates the instruction and its function prematurely with partial completion, the program provides the previous output power block sequencing value as the input power block sequencing value in the parameter block and re-issues the same instruction and its function for the machine to continue from processing the cipher technique from the previous partial completion point.

In one or more aspects, the machine saves the determined power block sequencing value of the next input message block, instead of the generated mask value of the next input message block in the parameter block, to hide the encrypted tweak value from an unauthorized user.

In one or more aspects, the machine does not store any values in the parameter block that may reveal the encrypted tweak value. In one or more aspects, the machine uses a technique that deviates from the cipher technique (provided as a standard) to generate the mask value (instead of first calculating and then encrypting the mask value) in a particular manner that both speeds up the cipher technique (e.g., XTS-AES) and protects the encrypted tweak value.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Further, other cryptographic algorithms may be used. Moreover, additional, less and/or other code may be used. Although particular code may be provided as an example of performing a particular operation, function or task, additional and/or other code may be used. Code may be combined and/or separated into code subsets. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
a set of one or more computer readable storage media; and
program instructions, collectively stored in the set of one or more computer readable storage media, for causing at least one computing device to perform computer operations including:
    executing a cipher instruction, the executing the cipher instruction including performing multiple operations as part of executing the cipher instruction, the multiple operations performed as part of executing the cipher instruction including:
        encrypting a confidential value to provide an encrypted confidential value, the confidential value and one or more other cryptographic parameters used in performing at least one operation of the multiple operations performed as part of executing the cipher instruction being input to the cipher instruction and specified using one or more locations of the cipher instruction;
        generating a mask value using the encrypted confidential value;
        performing a cipher operation on at least a portion of a message specified by the cipher instruction, the performing the cipher operation on the at least the portion of the message using the mask value; and
        providing a result of the cipher operation.

2. The computer program product of claim 1, wherein the generating the mask value includes multiplying the encrypted confidential value by a power block sequencing value to generate the mask value.

3. The computer program product of claim 2, wherein the power block sequencing value is input to the cipher instruction and is a changing value depending on which part of the message the cipher operation is being performed.

4. The computer program product of claim 1, wherein the generating the mask value includes using the encrypted confidential value and a power block sequencing value to generate the mask value, and wherein the executing the cipher instruction further includes performing block-wise updates to the power block sequencing value and the mask value, wherein the power block sequencing value and the mask value are maintained in-step with one another.

5. The computer program product of claim 4, wherein the computer operations further include:
    interrupting execution of the cipher instruction at a location of the message, wherein the cipher operation of the message ends prior to completion of the cipher operation of the message; and
    re-executing the cipher instruction, the re-executing obtaining an updated power block sequencing value to resume the cipher operation of the message at the location of the message, the updated power block sequencing value being an input to the cipher instruction being re-executed and based on the block-wise updates.

6. The computer program product of claim 5, wherein the message includes a plurality of message blocks, and wherein the location of the message is a message block of the plurality of message blocks of the message.

7. The computer program product of claim 6, wherein the performing block-wise updates includes updating the power block sequencing value and the mask value based on proceeding to a next message block of the message in the cipher operation.

8. The computer program product of claim 5, wherein operations of the cipher operation are sequenced using at least one hardware accelerator to allow the interrupting and the re-executing.

9. The computer program product of claim 8, wherein the power block sequencing value is maintained in the at least one hardware accelerator.

10. The computer program product of claim 1, wherein the cipher instruction obtains as input a plurality of cryptographic parameters to be used in performing the at least one operation of the multiple operations performed as part of executing the cipher instruction, the plurality of cryptographic parameters including the confidential value and the one or more other cryptographic parameters and are specified using one or more registers of the cipher instruction.

11. The computer program product of claim 10, wherein the plurality of cryptographic parameters includes a key to be used in the encrypting the confidential value, a data key to be used in the cipher operation, an address of the message, the confidential value and a power block sequencing value to be used to generate the mask value.

12. The computer program product of claim 11, wherein the key to be used in the encrypting the confidential value, the data key to be used in the cipher operation, the confidential value and the power block sequencing value are included in a parameter block, the parameter block being an input to the cipher instruction, wherein a register of the cipher instruction includes at least a portion of an address of the parameter block.

13. The computer program product of claim 1, wherein the message includes a plurality of message blocks and wherein the performing the cipher operation includes:
    determining a block mask value using the mask value for a message block of the plurality of message blocks; and
    performing the cipher operation on the message block using the block mask value.

14. The computer program product of claim 13, wherein the determining the block mask value for a next message block is based on the block mask value of a previous message block.

15. A computer system comprising:

at least one computing device;

a set of one or more computer-readable storage media; and program instructions, collectively stored in the set of one or more computer-readable storage media, for causing the at least one computing device to perform computer operations including:

executing a cipher instruction, the executing the cipher instruction including performing multiple operations as part of executing the cipher instruction, the multiple operations performed as part of executing the cipher instruction including:

encrypting a confidential value to provide an encrypted confidential value, the confidential value and one or more other cryptographic parameters used in performing at least one operation of the multiple operations performed as part of executing the cipher instruction being input to the cipher instruction and specified using one or more locations of the cipher instruction;

generating a mask value using the encrypted confidential value;

performing a cipher operation on at least a portion of a message specified by the cipher instruction, the performing the cipher operation on the at least the portion of the message using the mask value; and providing a result of the cipher operation.

16. The computer system of claim 15, wherein the generating the mask value includes using the encrypted confidential value and a power block sequencing value to generate the mask value, and wherein the executing the cipher instruction further includes performing block-wise updates to the power block sequencing value and the mask value, wherein the power block sequencing value and the mask value are maintained in-step with one another.

17. The computer system of claim 16, wherein the computer operations further include:

interrupting execution of the cipher instruction at a location of the message, wherein the cipher operation of the message ends prior to completion of the cipher operation of the message; and re-executing the cipher instruction, the re-executing obtaining an updated power block sequencing value to resume the cipher operation of the message at the location of the message, the updated power block sequencing value being an input to the cipher instruction being re-executed and based on the block-wise updates.

18. The computer system of claim 15, wherein the cipher instruction obtains as input a plurality of cryptographic parameters to be used in performing the at least one operation of the multiple operations performed as part of executing the cipher instruction, the plurality of cryptographic parameters including the confidential value and the one or more other cryptographic parameters and are specified using one or more registers of the cipher instruction, and wherein the plurality of cryptographic parameters includes a key to be used in the encrypting the confidential value, a data key to be used in the cipher operation, an address of the message, the confidential value and a power block sequencing value to be used to generate the mask value.

19. A computer-implemented method comprising:

executing a cipher instruction, the executing the cipher instruction including performing multiple operations as part of executing the cipher instruction, the multiple operations performed as part of executing the cipher instruction including:

encrypting a confidential value to provide an encrypted confidential value, the confidential value and one or more other cryptographic parameters used in performing at least one operation of the multiple operations performed as part of executing the cipher instruction being input to the cipher instruction and specified using one or more locations of the cipher instruction;

generating a mask value using the encrypted confidential value;

performing a cipher operation on at least a portion of a message specified by the cipher instruction, the performing the cipher operation on the at least the portion of the message using the mask value; and providing a result of the cipher operation.

20. The computer-implemented method of claim 19, wherein the generating the mask value includes using the encrypted confidential value and a power block sequencing value to generate the mask value, and wherein the executing the cipher instruction further includes performing block-wise updates to the power block sequencing value and the mask value, wherein the power block sequencing value and the mask value are maintained in-step with one another.

21. The computer-implemented method of claim 20, further comprising:

interrupting execution of the cipher instruction at a location of the message, wherein the cipher operation of the message ends prior to completion of the cipher operation of the message; and re-executing the cipher instruction, the re-executing obtaining an updated power block sequencing value to resume the cipher operation of the message at the location of the message, the updated power block sequencing value being an input to the cipher instruction being re-executed and based on the block-wise updates.

22. The computer-implemented method of claim 19, wherein the cipher instruction obtains as input a plurality of cryptographic parameters to be used in performing the at least one operation of the multiple operations performed as part of executing the cipher instruction, the plurality of cryptographic parameters including the confidential value and the one or more other cryptographic parameters and are specified using one or more registers of the cipher instruction, and wherein the plurality of cryptographic parameters includes a key to be used in the encrypting the confidential value, a data key to be used in the cipher operation, an address of the message, the confidential value and a power block sequencing value to be used to generate the mask value.

23. A computer system comprising:

at least one hardware accelerator to be used in executing a cipher instruction, the executing the cipher instruction including:

encrypting a confidential value to provide an encrypted confidential value;

generating a mask value using the encrypted confidential value, wherein the generating the mask value includes multiplying the encrypted confidential value by a power block sequencing value to generate the mask value;

performing a cipher operation on at least a portion of a message specified by the cipher instruction, the performing the cipher operation on the at least the portion of the message using the mask value; and providing a result of the cipher operation.

24. The computer system of claim 23, wherein the executing the cipher instruction further includes performing block-wise updates to the power block sequencing value and the mask value, wherein the power block sequencing value and the mask value are maintained in-step with one another, and wherein the computer system is further used to perform computer operations including:

interrupting execution of the cipher instruction at a location of the message, wherein the cipher operation of the message ends prior to completion of the cipher operation of the message; and re-executing the cipher instruction, the re-executing obtaining an updated power block sequencing value to resume the cipher operation of the message at the location of the message, wherein operations of the cipher operation are sequenced to enable the interrupting and the re-executing.

25. A computer-implemented method comprising:

executing a cipher instruction using at least one hardware accelerator, the executing the cipher instruction including:

encrypting a confidential value to provide an encrypted confidential value;

generating a mask value using the encrypted confidential value, wherein the generating the mask value includes multiplying the encrypted confidential value by a power block sequencing value to generate the mask value;

performing a cipher operation on at least a portion of a message specified by the cipher instruction, the performing the cipher operation on the at least the portion of the message using the mask value; and providing a result of the cipher operation.

* * * * *